(12) United States Patent
Chang et al.

(10) Patent No.: US 8,875,172 B1
(45) Date of Patent: Oct. 28, 2014

(54) CONTENT SORTING AND CHANNEL DEFINITION TECHNOLOGY

(75) Inventors: Jack H. Chang, Saratoga, CA (US);
William H. Sheu, Fremont, CA (US);
Sherman Tuan, Cupertino, CA (US)

(73) Assignee: PurpleComm Inc., Santa Clara, CA (US)

(*) Notice: Subject to any disclaimer, the term of this patent is extended or adjusted under 35 U.S.C. 154(b) by 770 days.

(21) Appl. No.: 12/795,007

(22) Filed: Jun. 7, 2010

(51) Int. Cl.
*H04N 7/10* (2006.01)
*H04N 7/025* (2006.01)
*H04N 7/173* (2011.01)

(52) U.S. Cl.
USPC .................. 725/32; 725/34; 725/35; 725/36; 725/109; 725/110

(58) Field of Classification Search
USPC .............. 725/32, 34–36, 40–42, 51, 109–112
See application file for complete search history.

(56) References Cited

U.S. PATENT DOCUMENTS

| | | | |
|---|---|---|---|
| 6,760,916 B2* | 7/2004 | Holtz et al. | 725/34 |
| 7,089,579 B1 | 8/2006 | Mao et al. | |
| 7,225,456 B2 | 5/2007 | Kitsukawa et al. | |
| 7,228,560 B2* | 6/2007 | Panabaker | 725/114 |
| 8,001,577 B2* | 8/2011 | Fries | 725/113 |
| 8,384,743 B2* | 2/2013 | Gorti et al. | 345/635 |
| 2002/0078456 A1* | 6/2002 | Hudson et al. | 725/60 |
| 2002/0184634 A1 | 12/2002 | Cooper | |
| 2003/0110503 A1 | 6/2003 | Perkes | |
| 2003/0221197 A1 | 11/2003 | Fries et al. | |
| 2005/0081244 A1 | 4/2005 | Barrett et al. | |
| 2006/0075428 A1 | 4/2006 | Farmer et al. | |
| 2007/0277219 A1 | 11/2007 | Toebes et al. | |
| 2008/0022320 A1 | 1/2008 | Ver Steeg | |
| 2008/0115182 A1 | 5/2008 | van Willigenburg | |
| 2009/0083815 A1* | 3/2009 | McMaster et al. | 725/110 |
| 2009/0254931 A1* | 10/2009 | Pizzurro et al. | 725/5 |
| 2011/0153631 A1* | 6/2011 | Kondasani | 707/758 |
| 2012/0124630 A1* | 5/2012 | Wellen et al. | 725/109 |

FOREIGN PATENT DOCUMENTS

WO    WO2006041784 A2    4/2006

* cited by examiner

*Primary Examiner* — Nasser Goodarzi
*Assistant Examiner* — Fred Peng
(74) *Attorney, Agent, or Firm* — Fish & Richardson P.C.

(57) ABSTRACT

Content sorting and definition technology, in which input defining multiple content links to include in a channel is received from a content curator and supplemental channel information that facilitates user experience of content linked to by at least one of the multiple content links is determined. Channel information for the channel associated with the content curator is defined based on the multiple content links and the supplemental channel information and the defined channel information is published at a channel link to make the channel information available to user devices of a content delivery network. The channel link is a network address at which the defined channel information is made available to the user devices of the content delivery network.

22 Claims, 16 Drawing Sheets

300

RECEIVE, FROM A CONTENT CURATOR, INPUT DEFINING MULTIPLE CONTENT LINKS TO INCLUDE IN A CHANNEL ASSOCIATED WITH THE CONTENT CURATOR, EACH CONTENT LINK INCLUDING AN ADDRESS AT WHICH CONTENT IS MADE AVAILABLE OVER A NETWORK  302

DETERMINE SUPPLEMENTAL CHANNEL INFORMATION THAT FACILITATES USER EXPERIENCE OF CONTENT LINKED TO BY AT LEAST ONE OF THE MULTIPLE CONTENT LINKS  304

DEFINE CHANNEL INFORMATION FOR THE CHANNEL ASSOCIATED WITH THE CONTENT CURATOR BASED ON THE MULTIPLE CONTENT LINKS AND THE SUPPLEMENTAL CHANNEL INFORMATION  306

PUBLISH THE DEFINED CHANNEL INFORMATION AT A CHANNEL LINK TO MAKE THE CHANNEL INFORMATION AVAILABLE TO USER DEVICES OF A CONTENT DELIVERY NETWORK  308

FIG. 3

Example DJ Channel
DJ Channel Name: My DJ Channel
DJ Channel Link: http://9x9.tv/channel/rssfeed/123456.html
Notes: Documentaries and other interesting content

| Content Link | Hot Index | Preview Content | Notes |
|---|---|---|---|
| http://isohunt.com/download/12345/torrentA.torrent | 1:20, 3:30, 4:30 | myChannel1.wmv | |
| http://9x9.tv/licensedcontent/video/54321.torrent | 15:20, 30:20 | myChannel2.wmv | |
| http://www.nonprofitA.org/download/fileB.torrent | 00:00, 3:56 | | interesting documentary |
| http://9x9.tv/licensedcontent/video/22333.torrent | 00:40 | myChannel4.wmv | |
| http://www.youtube.com/watch?v=xxx&feature=featured | | | |
| http://www.broadcasterA.com/watch/show1-episode4 | 13:45, 32:45 | myChannel6.wmv | |

FIG. 10

CONTENT SORTING AND CHANNEL DEFINITION TECHNOLOGY

FIELD

The present disclosure generally relates to content sorting and definition technology.

BACKGROUND

Content viewers today are exposed to an overwhelming amount of information and are challenged by the degree of interaction and personalization needed to manage this massive amount of information. In an era of digital communications, a user may be confused by an array of technology including traditional analog televisions, DVRs (Digital Video Recorders), PVRs (Personal Video Recorders), media centers, EPG (Electronic Program Guide)-based systems, Internet-related content, and traditional remote control devices.

SUMMARY

In one aspect, a method of providing channel information to users of a content delivery network includes receiving, from a content curator, input defining multiple content links to include in a channel associated with the content curator. Each content link includes an address at which content is made available over a network. The method also includes determining, using a network server system, supplemental channel information that facilitates user experience of content linked to by at least one of the multiple content links and defining, using the network server system, channel information for the channel associated with the content curator based on the multiple content links and the supplemental channel information. The method further includes publishing, using the network server system, the defined channel information at a channel link for the channel associated with the content curator to make the defined channel information available to user devices of a content delivery network. The channel link is a network address at which the defined channel information is made available to the user devices of the content delivery network.

Implementations may include one or more of the following features. For example, the method may include determining, using the network server system, one or more hot indices for at least one of the multiple content links included in the channel associated with the content curator and defining, using the network server system, channel information for the channel associated with the content curator based on the multiple content links and the one or more hot indices.

In some implementations, the method may include enabling the content curator to review content linked to by a particular content link from the multiple content links included in the channel associated with the content curator and receiving, from the content curator, selection of one or more hot indices to define in the content linked to by the particular content link. Each of the one or more hot indices may point to a different position within the content linked to by the particular content link. In these implementations, the method may include storing, in association with the particular content link and for each of the one or more hot indices, timing data that indicates the position within the content linked to by the particular content link pointed to by the corresponding hot index.

In some examples, the method may include monitoring users viewing behavior when viewing content linked to by a particular content link from the multiple content links included in the channel associated with the content curator and, based on the monitoring, collecting viewing behavior analytics data for the content linked to by the particular content link. In these examples, the method may include automatically creating, without human intervention, one or more hot indices for the content linked to by the particular content link based on the viewing behavior analytics data. Each of the one or more hot indices may point to a different position within the content linked to by the particular content link. Further, in these examples, the method may include storing, in association with the particular content link and for each of the one or more automatically created hot indices, timing data that indicates the position within the content linked to by the particular content link pointed to by the corresponding hot index.

In addition, the method may include monitoring users fast forwarding, rewinding, and playing behavior when viewing content linked to by a particular content link from the multiple content links included in the channel associated with the content curator and, based on the monitoring, collecting fast forwarding, rewinding, and playing behavior data for the content linked to by the particular content link. The fast forwarding, rewinding, and playing behavior data may include data indicating portions of the content linked to by the particular content link where users fast forward the content, portions of the content linked to by the particular content link where users rewind the content, and portions of the content linked to by the particular content link where users play the content. The method may include automatically creating, without human intervention, one or more hot indices for the content linked to by the particular content link based on the fast forwarding, rewinding, and playing behavior data. At least one of the hot indices may be created to identify a position within the content linked to by the particular content link where users transition from fast forwarding or rewinding the content to playing the content.

The method may include determining, using the network server system, a content preview file to associate with at least one of the multiple content links included in the channel associated with the content curator and defining, using the network server system, channel information for the channel associated with the content curator based on the multiple content links and the determined content preview file to associate with at least one of the multiple content links included in the channel associated with the content curator. The method also may include enabling the content curator to review content linked to by a particular content link from the multiple content links included in the channel associated with the content curator and receiving, from the content curator, selection of a subset of the content linked to by the particular content link. The method further may include generating a particular content preview file for the content linked to by the particular content link using the subset of the content linked to by the particular content link selected by the content curator and storing, in association with the particular content link, the generated content preview file.

In some examples, the method may include, in response to input adding a particular content link to the channel associated with the content curator, automatically, without human intervention, searching for a previously-generated content preview file corresponding to content linked to by the particular content link and, based on results of the searching, determining whether a previously-generated content preview file exists for the content linked to by the particular content link. In these examples, the method may include, in response to a determination that a previously-generated content preview file exists for the content linked to by the particular content link, automatically storing, in association with the particular content link, the previously generated content preview file. In response to a determination that a previously-generated content preview file does not exist for the content linked to by the particular content link, the content curator may be prompted to define a content preview file for the content linked to by the particular content link. In response to a determination that a previously-generated content preview file does not exist for the content linked to by the particular content link, a default content preview file may be generated for the content linked to by the particular content link.

Further, the method may include determining, using the network server system, metadata to associate with the channel generally and metadata to associate at least one of the multiple content links included in the channel associated with the content curator and defining, using the network server system, channel information for the channel associated with the content curator based on the multiple content links and the metadata to associate with the channel generally and the metadata to associate at least one of the multiple content links included in the channel associated with the content curator. The method also may include determining, using the network server system, order information for arranging the multiple content links in the channel associated with the content curator and defining, using the network server system, channel information for the channel associated with the content curator based on the multiple content links and the determined order information for arranging the multiple content links in the channel associated with the content curator.

In some implementations, the method may include determining, using the network server system, that one or more modifications to the channel information that defines the channel associated with the content curator are needed and, in response to the determination that one or more modifications to the channel information that defines the channel associated with the content curator are needed, identifying, using the network server system, updated channel information that defines updates to the channel information needed to make the one or more modifications. In these implementations, the method may include publishing, using the network server system, the updated channel information at the channel link for the channel associated with the content curator such that user devices of subscribers to the channel associated with the content curator receive the updated channel information through the channel link.

In addition, the method may include receiving, from the content curator, input describing one or more modifications to content links included in the channel associated with the content curator and determining that one or more modifications to the channel information that defines the channel associated with the content curator are needed based on the received input describing one or more modifications to content links included in the channel associated with the content curator. The method also may include receiving, from the content curator, input describing one or more modifications to supplemental channel information related to the channel associated with the content curator and determining that one or more modifications to the channel information that defines the channel associated with the content curator are needed based on the received input describing one or more modifications to supplemental channel information related to the channel associated with the content curator.

The method may include electronically monitoring, without human intervention, aspects of the channel associated with the content curator and, based on the monitoring, automatically, without human intervention, determining that one or more modifications to content links included in the channel associated with the content curator are needed. For instance, the method may include electronically monitoring, without human intervention, aspects of the channel associated with the content curator and, based on the monitoring, automatically determining, without human intervention, that one or more modifications to supplemental channel information related to the channel associated with the content curator are needed. The method also may include publishing, using the network server system, only the updated channel information at the channel link for the channel associated with the content curator such that user devices of subscribers to the channel associated with the content curator that previously received the defined channel information receive only the updated channel information through the channel link.

In some examples, the method may include receiving, from the content curator, input defining a first link to streaming content, the first link including a first address at which content is streamed over a network to user devices. In these examples, the method may include receiving, from the content curator, input defining a second link to downloadable content. The second link may include a second address at which content is available to be downloaded over a network by user devices. Further, in these examples, the method may include publishing, using the network server system, the defined channel information that includes the first link and the second link such that the channel associated with the content curator includes the streaming content linked to by the first link and the downloadable content linked to by the second link.

In another aspect, a system includes at least one computer and at least one computer-readable medium coupled to the at least one computer having instructions stored thereon which, when executed by the at least one computer, causes the at least one computer to perform operations. The operations include receiving, from a content curator, input defining multiple content links to include in a channel associated with the content curator. Each content link includes an address at which content is made available over a network. The operations also include determining supplemental channel information that facilitates user experience of content linked to by at least one of the multiple content links and defining channel information for the channel associated with the content curator based on the multiple content links and the supplemental channel information. The operations further include publishing the defined channel information at a channel link to make the defined channel information available to user devices of a content delivery network. The channel link is a network address at which the defined channel information is made available to the user devices of the content delivery network.

In yet another aspect, at least one computer-readable storage medium is encoded with at least one computer program comprising instructions that, when executed, operate to cause a computer to perform operations. The operations include receiving, from a content curator, input defining multiple content links to include in a channel associated with the content curator. Each content link includes an address at which content is made available over a network. The operations also include determining supplemental channel information that facilitates user experience of content linked to by at least one of the multiple content links and defining channel information for the channel associated with the content curator based on the multiple content links and the supplemental channel information. The operations further include publishing the defined channel information at a channel link to make the defined channel information available to user devices of a content delivery network. The channel link is a network address at which the defined channel information is made available to the user devices of the content delivery network.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIGS. 3-8, 11, 12, and 14 are flowcharts of exemplary processes.

FIG. 10 illustrates an exemplary channel definition.

Like reference numbers represent corresponding parts throughout.

DETAILED DESCRIPTION

Figure 1:
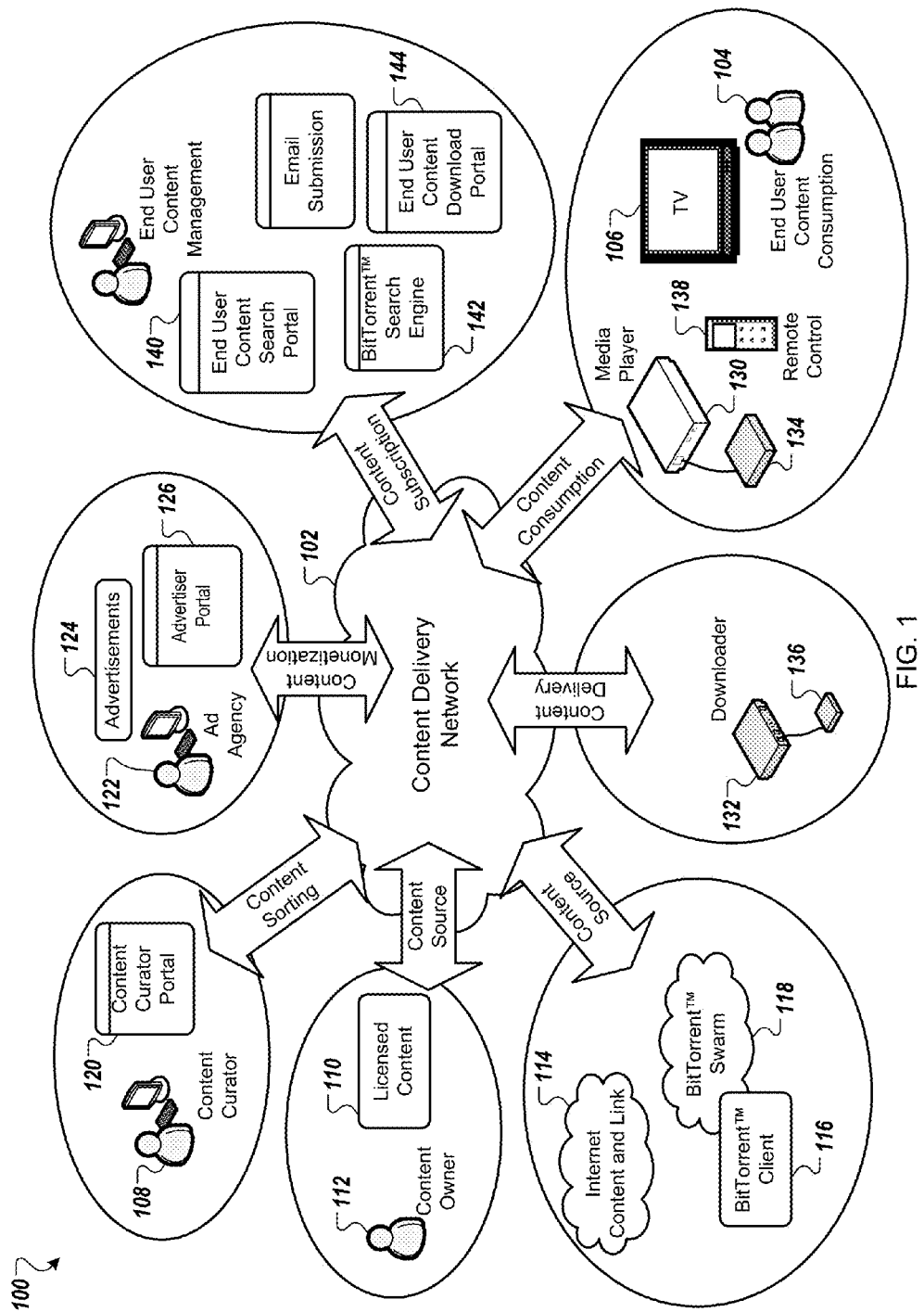
FIGS. 1, 2, 9 and 16 are diagrams of exemplary systems.

FIG. 1 illustrates a content delivery system 100. The system 100 provides support for various aspects of content delivery, such as content sourcing, content sorting, content monetization, content subscription, content download, and content consumption. The content delivery system 100 includes a content delivery network 102. The content delivery network 102 may be one or more public or private, wired or wireless networks, such as the Internet or a Session Initiated Protocol (SIP) network such as the PsipTN™ network offered by TelTel™. Using the system 100, end users 104 may view channels, for example, on a television 106 located in their home. Channels may be defined by end users 104, or by "content curators" 108.

Multiple types of content, such as audio (e.g., music, podcasts), video, and still images (e.g., photographs), may be made available over the content delivery network 102. Licensed and license-free content may be made available. For example, licensed content 110 may be acquired from a content owner 112.

Content may be made available from a variety of sources. For example, Internet content may be accessed from an Internet link 114 (e.g., URL (Uniform Resource Locator)). Content may also be accessed from peer-to-peer networks. For example, content may be accessed from one or more BitTorrent™ clients 116 which are part of one or more BitTorrent™ "swarms" 118. Content may be accessed from other sources, such as from a television broadcast (e.g., MSO (Multiple System Operator), cable, satellite, local) or from content (e.g., photographs, audio, previously recorded video) available from devices (e.g., DVR, stereo, computer, DVD (Digital Video Disc) player) connected to a user's home network and/or located in a user's home.

Content curators 108 may use a content curator portal 120 to define custom channels which may be made available for subscription by end users 104. The content curators 108 may be commissioned to search for, select, and organize multiple types of content from various sources into channels. Content curators 108 may, for example, organize channels by topic or genre. Content curators 108 may, for example, select licensed content, license-free content, BitTorrent™ content, or content from their private collection, to name a few examples.

Channels may be offered for free to end users 104 or end users 104 may subscribe to channels on a fee basis. Users may rate or rank channels or content curators based, for example, on programming selection, sequencing, and quality. Content curators 108 may be promoted, for example, based on popularity.

Content owners 112 may be compensated for the use of licensed content 110 that they own which is used in channels defined by content curators 108. For example, the system 100 may provide support for digital rights management (DRM). By allowing access to their licensed content 110, content owners 112 may experience increased distribution and revenue and targeted exposure in focused channels. Multiple revenue agreements may be possible, such as per-use agreements, subscription revenue sharing, and advertisement revenue sharing.

A content curator 108 may work with one or more advertisers 122, such as an ad agency, to include advertisements 124 on a channel. For example, an advertisement may be displayed if a user switches a channel or when a program finishes. As another example, advertisements may be displayed on the display of a remote control device, such as while a program is being displayed on a television. Content curators 108, advertisers 122, and content owners 112 may share advertising revenue. Sharing in advertising revenue may provide an incentive for content curators 108 to create interesting and popular channels. A content curator 108 may work with one or more advertisers 122 to create one or more advertisements 124 which are customized and targeted for one or more particular channels. End users 104 may customize advertisement viewing preferences, such as by specifying preferred topics, preferred or excluded companies, region preferences, etc.

Advertisers 122 may use an advertiser portal 126 to upload advertisements 124 and to control advertisement publication. Advertisers 122 may define and apply advertisement insertion rules to particular advertisements 124 and/or may allow a content curator 108 to decide when and how to insert the advertisements 124 into channels defined by the content curator 108. APIs (Application Programming Interfaces) may be provided which allow advertisers 122 to enable the system 100 to interface with standard advertisement inventory management systems to allow for control and management of advertisements 124. Various advertisement pricing plans may be supported, such as individually-priced ads or bulk pricing. Other advertising features may be included, such as online purchasing of items or providing customer contact options.

Advertisers 122, content curators 108, and content owners 112 may access user viewing behavior data. Advertisers 122 may access user viewing behavior data, such as viewed channels, viewed content, viewed advertisements, advertisement display frequency, advertisement viewed length, user actions during advertisement display, user characteristics, advertisement and content view times, advertisement and content view counts, and hosting channel information, to monitor reach and performance of advertising campaigns. Advertisements may be targeted to specific users based on recorded user viewing behavior data. Content curators 108 may access user viewing behavior data to learn about behaviors of end users 104 who subscribe to their channels. Content owners 112 may access user viewing behavior data to learn about their fan base, such as accessing information about user demographics, time of day of access, and user actions during content display. Content presentation and playback may be customized and personalized for a particular end user 104, based specifically on recorded user viewing behavior of the particular end user 104 and generally on recorded user viewing behavior of all users.

User viewing behavior data may be captured, for example, by a media player 130 and/or a downloader device 132. The media player 130 and/or the downloader device 132 may play content included or ordered on a channel defined by a content curator 108. In some implementations, the media player 130 may play content downloaded from the content delivery network 102 by the downloader device 132. In some implementations, the media player 130 and the downloader device 132 are different logical functions of the same physical device. In other implementations, the media player 130 and the downloader device 132 are different physical devices. In some implementations, the media player 130 is a software application which may be executed, for example, on a computing device such as a desktop or laptop computer.

The media player 130 and/or the downloader device 132 may be connected to external media storage devices 134, 136 respectively. The external media storage devices 134, 136 may be, for example, USB (Universal Serial Bus) drives. The external media storage devices 134, 136 may be used, for example, to transfer data to/from the media player 130 or the downloader device 132, respectively, such as to transfer data to/from a computing device.

The media player 130 and/or the downloader device 132 may communicate wirelessly with one or more remote control devices 138. The end user 104 may navigate through channels and perform other functions using the remote control device 138. The remote control device 138 may communicate (e.g., using Infrared (IR) technology of radio frequency (RF) technology) with the television 106, the media player 130, and/or the downloader device 132. The remote control device 138 also may communicate over a network with the media player 130 and/or the downloader device 132 to control functions of the media player 130 or the downloader device 132. The remote control device 138 may include a small display screen that displays preview content and/or advertisements.

The media player 130 and/or the downloader device 132 may download content from the content delivery network 102 without consuming resources of a computing device owned by the end user 104. For example, content may be downloaded into the home of an end user 104 without using resources of a personal computer owned by the end user 104. The media player 130 and the downloader device 132 may use less electricity than a personal computer, thus reducing the electric bill of the end user 104. The media player 130 and/or the downloader device 132 may connect to other computing devices connected on a user's home network. The media player 130 and/or the downloader device 132 may include built-in functionality to communicate with and download information from a peer-to-peer network, such as the BitTorrent™ swarm 118.

The end user 104 may search for and subscribe to content using an end-user content search portal 140. For example, the end-user content search portal 140 may provide a directory listing of available defined channels. The directory listing may be organized in a hierarchy of categories and sub-categories. A particular channel may appear in one or more categories or sub-categories. The end-user content search portal 140 may also provide a search function to allow end users to search for available defined channels based on a keyword search. As another example, users may search for channels based on other criteria, such as sorting channels based on channel or content curator popularity or ranking. An end user may subscribe to a defined channel, for example, by selecting a channel link displayed in a directory listing or in a list of search results.

The end user 104 may also search for and initiate download of individual content items to the downloader device 132 using a partner site such as a BitTorrent™ search engine 142.

As another example, the end user 104 may send an email which includes a content link to an email address associated with their downloader device 132 to initiate an automatic download to the downloader device 132 of the content linked to by the content link. The content link may refer to a content file available on the Internet, and may be a reference to a video resource available from a streaming video website. The end user 104 may send an email with an attachment to an email address associated with the downloader device 132, to initiate a download of the attachment to the downloader device 132. The end user 104 may use an end-user content download portal 144 to search for and to select content to download to the downloader device 132.

Figure 2:
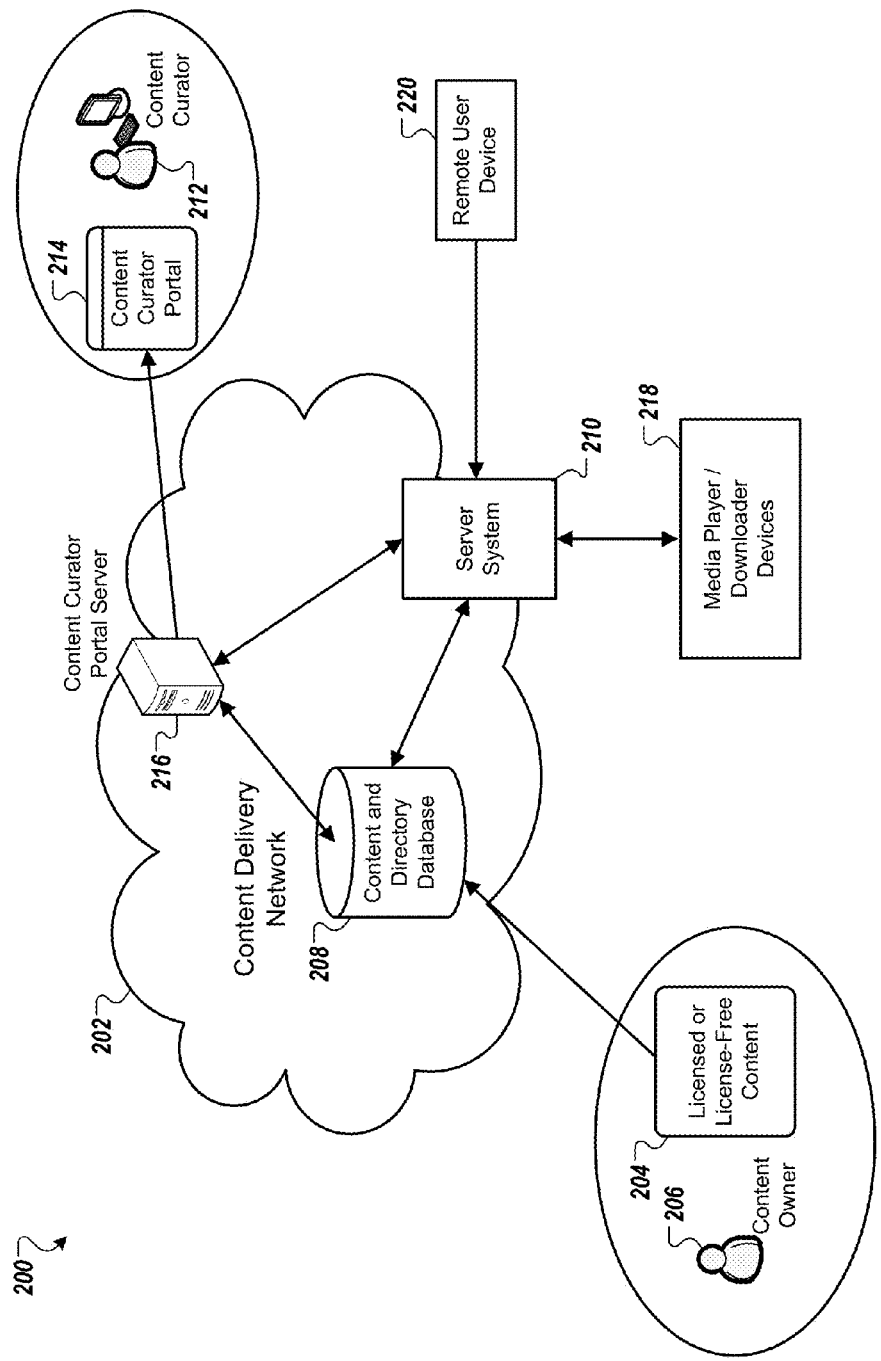

FIG. 2 illustrates a system 200 for content sourcing and download over a content delivery network 202. Licensed or license-free content 204 is acquired from one or more content owners 206 or from a publicly available source, such as the Internet. For example, content owners 206 may transfer content over the content delivery network 202 to a content and directory database 208. Content may also be transferred to the content and directory database 208 from a server system 210, such as using a DVD or CD (Compact Disc) drive. License-free content, such as license-free video or podcasts, may be downloaded from the Internet and stored in the content and directory database 208. In some implementations, some or all content may be stored in the content and directory database 208 as BLOBs (Binary Large Objects). In some implementations, some or all content may be stored in the file system of the server system 210 and references to file system locations may be stored in the content and directory database 208.

The content and directory database 208 stores information about content and also information about defined channels. Content curators 212 may use a content curator portal 214 to define channels and to manage defined channels. The content curator portal 214 may display a listing of licensed and license-free content available in the content and directory database 208. The content curator portal 214 may also provide a search function which allows the content curator 212 to search for content available in the content and directory database 208 and to also search for content available on the Internet, such as content available from peer-to-peer networks, such as BitTorrent™.

The content curator portal 214 may communicate with a content curator server 216. For example, a channel definition defined using the content curator portal 214 may be sent to the content curator server 216, which may communicate with the server system 210 to request that the channel definition be stored in the content and directory database 208. As another example, information for existing channel definitions associated with a particular content curator 212 may be retrieved from the content and directory database 208 and sent from the content curator portal server 216 to the content curator portal 214 for display.

In some implementations, the content curator portal server 216 is one physical server computing device and in other implementations, the content curator portal server 216 includes multiple physical server computing devices. Similarly, in some implementations, the server system 210 is one physical server computing device, and in other implantations, the server system 210 includes multiple physical server computing devices. In some implementations, multiple physical server computing devices are used, with some or all server computing devices implementing both the content curator portal server 216 and the server system 210. In some implementations, one physical server computing device is used, with the one physical server device implementing both the content curator portal server 216 and the server system 210.

The network 202 may be one or more public or private, wired or wireless networks, such as the Internet, or may be a Session Initiated Protocol (SIP) network such as the PsipTN™ network offered by TelTel™. The network 202 may include, for example, one or more of the Internet, Wide Area Networks (WANs), Local Area Networks (LANs), analog or digital wired and wireless telephone networks (e.g., a PSTN, Integrated Services Digital Network (ISDN), and Digital Subscriber Line (xDSL)), radio, television, cable, satellite, and/or any other delivery or tunneling mechanism for carrying data services. The network 202 may include multiple networks or subnetworks, each of which may include, for example, a wired or wireless data pathway.

Content may be downloaded to one or more user media player/downloader devices 218. For example, content corresponding to a user-subscribed channel may be automatically downloaded to the media player/downloader device 218, in response to a user selection of a corresponding channel. As another example, a user may search for and download content to the media player/downloader device 218. A user may, using a remote user device 220, monitor and manage user-initiated downloads. The remote user device 220 may be any type of electronic device configured to exchange communications with the server system 210 over a network. The remote user device 220 may be a general-purpose computer (e.g., a desktop personal computer, a workstation, or a laptop computer), a mobile or wireless device, or a device designed for a specific function (e.g., a cell phone, a smart phone, a tablet PC, a personal digital assistant (PDA), etc.).

FIG. 3 illustrates a process 300 for defining channel information. The operations of the process 300 are described generally as being performed by the system 200. The operations of the process 300 may be performed by one of the components of the system 200 (e.g., the server system 210) or may be performed by a combination of the components of the system 200. In some implementations, operations of the process 300 may be performed by one or more processors included in one or more electronic devices.

The system 200 receives, from a content curator, input defining multiple content links to include in a channel associated with the content curator, with each content link including an address at which content is made available over a network (302). For example, a content curator may search for and select multiple content links using a content curator portal. The content curator portal may display a listing of content available in a content and directory database. The content curator portal may also provide a search function which allows the content curator to search for content available in the content and directory database and to also search for publicly-available content, such as content available on the Internet. The content curator may select content links which link to various types of content, such as Internet video, podcasts, BitTorrent™ content, other peer-to-peer content, licensed and license-free content, music, etc. For BitTorrent™ content, the content link may refer to a BitTorrent™ torrent file. For other content, the content link may be a URL. When selecting content links for a channel, the content curator may select links that have a characteristic in common, such as links relating to the same genre.

The system 200 determines supplemental channel information that facilitates user experience of content linked to by at least one of the multiple content links (304). Supplemental channel information may include, for example, one or more hot indices, one or more content preview files, metadata, or content order information. A hot index points or refers to a position of interest within a content file. Supplemental channel information is described in more detail below with respect to FIG. 4.

Figure 4:
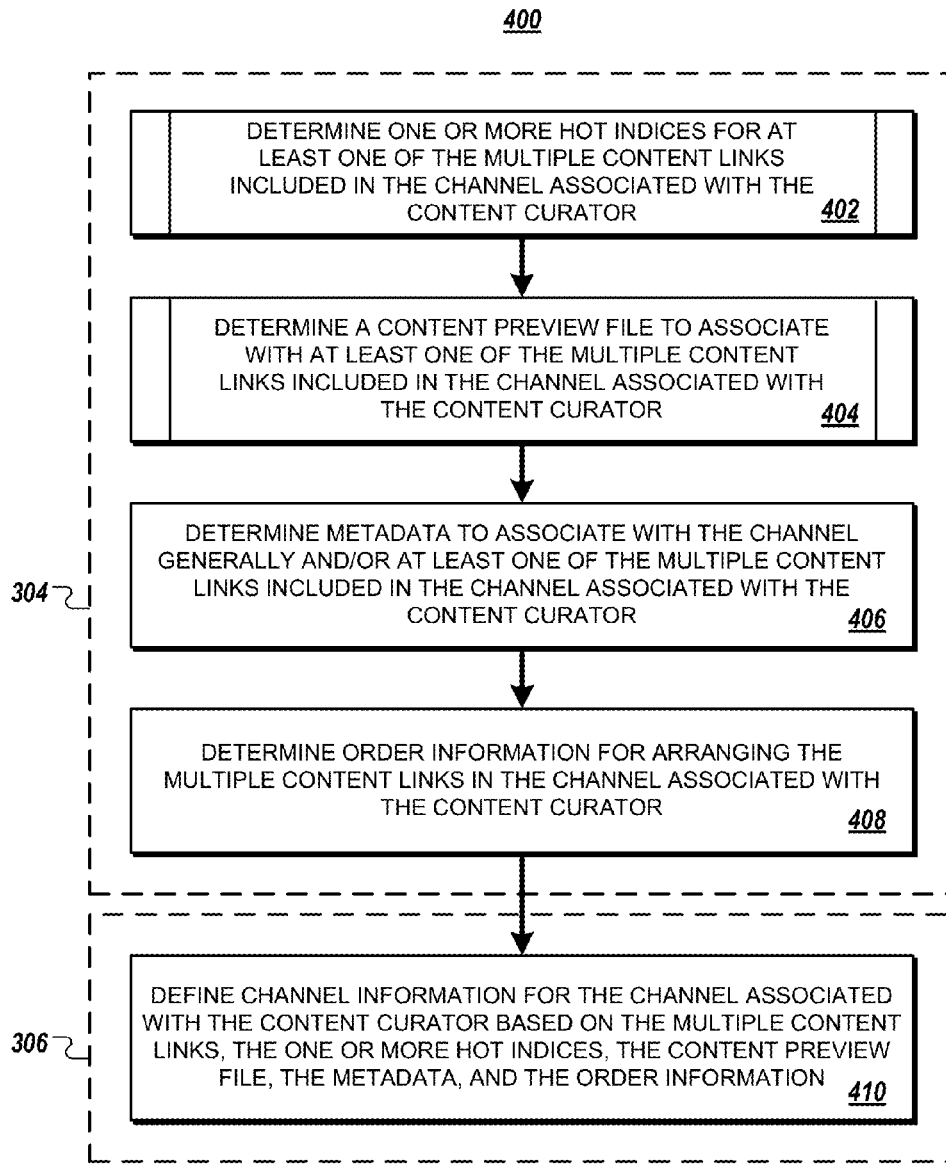

FIG. 4 illustrates a process 400 for defining channel information based on supplemental channel information. The process 400 may be used in determining supplemental channel information referenced above with respect to reference numeral 304 and in defining channel information for the channel associated with the content curator referenced below with respect to reference number 306. The operations of the process 400 are described generally as being performed by the system 200. The operations of the process 400 may be performed by one of the components of the system 200 (e.g., the server system 210) or may be performed by a combination of the components of the system 200. In some implementations, operations of the process 400 may be performed by one or more processors included in one or more electronic devices.

The system 200 determines one or more hot indices for at least one of the multiple content links included in the channel associated with the content curator (402). Hot indices are described in more detail below with respect to FIGS. 5 and 6.

Figure 5:
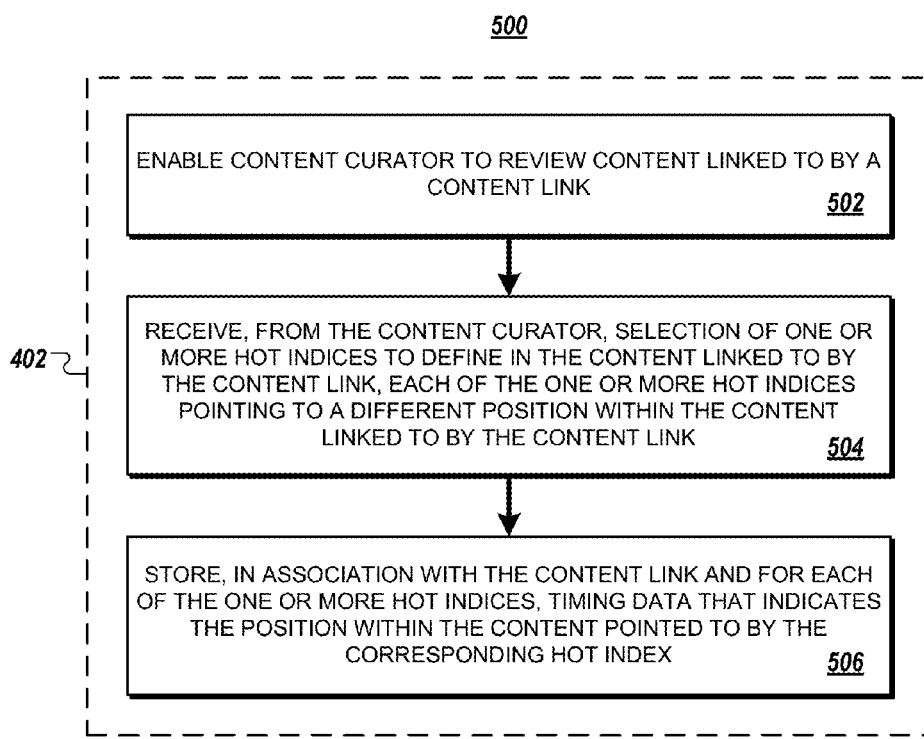

FIG. 5 illustrates a process 500 for determining hot indices. The process 500 may be used in determining one or more hot indices referenced above with respect to reference numeral 402. The operations of the process 500 are described generally as being performed by the system 200. The operations of the process 500 may be performed by one of the components of the system 200 (e.g., the server system 210) or may be performed by a combination of the components of the system 200. In some implementations, operations of the process 500 may be performed by one or more processors included in one or more electronic devices.

The system 200 enables a content curator to review content linked to by a content link (502). For example, the content curator may review content using a media player application which is capable of playing multiple types of content (e.g., various types of video content, music content). The media player application may be part of or may be accessed through a content curator portal. The content curator may use the media player application to play the content linked to by the content link, as well as to stop, fast forward, rewind, and restart the content. The content may be viewed online (e.g., in a streaming format), or some or all of the content may be downloaded before viewing by the content curator. Some content may be retrieved from a content and directory database prior to being viewed.

The system 200 receives, from the content curator, selection of one or more hot indices to define in the content linked to by the content link, where each of the one or more hot indices points to a different position within the content linked to by the content link (504). For example, the content curator may play the content linked to by the content link in a media player application and may define a hot index in the content by pausing the content playback when a particular point of interest within the content is reached. While the playback is paused, the content curator may, for example, select a "define hot index" control of the media player application (e.g., button, menu) to define a hot index at the current (e.g., paused) position within the content. The content curator may restart playback of the content in the media player application and may define additional hot indices by repeating, for each additional hot index, a pausing of the playback at a point of interest within the content and a selecting of the "define hot index" control.

The system 200 stores, in association with the content link and for each of the one or more hot indices, timing data that indicates the position within the content pointed to by the corresponding hot index (506). For example, timing data for a hot index can include hour, minute, and second values which collectively indicate the position within the content associated with the hot index. Timing data can include, for example, values such as "1:02:00" (indicating hour one, minute two, second zero), "02:12:30:" (indicating hour two, minute twelve, second thirty), and "00:05:11" (indicating hour zero, minute five, second eleven). Timing data for each hot index associated with a content link may be stored in association with the content link in a database, such as in a content and directory database.

Figure 6:
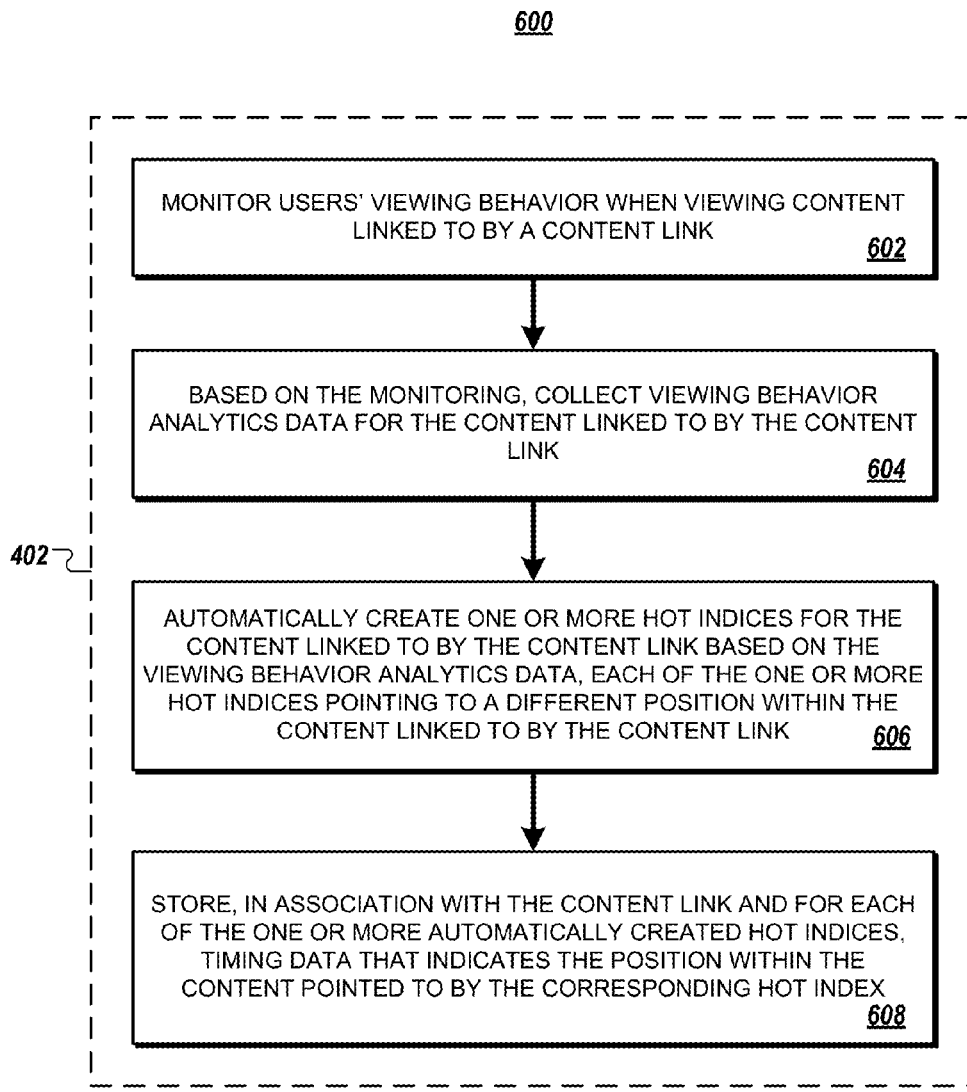

FIG. 6 illustrates a process 600 for determining hot indices. The process 600 may be used in determining one or more hot indices referenced above with respect to reference numeral 402. The operations of the process 600 are described generally as being performed by the system 200. The operations of the process 600 may be performed by one of the components of the system 200 (e.g., the server system 210) or may be performed by a combination of the components of the system 200. In some implementations, operations of the process 600 may be performed by one or more processors included in one or more electronic devices.

The system 200 monitors users' viewing behavior when viewing content linked to by a content link (602). For example, the system 200 may monitor users' fast forwarding, rewinding, stopping, playing, and other behaviors when viewing content linked to by a particular content link. For example, the system may track where in the content a user stops after fast forwarding or may track where in the content a user stops after rewinding. As another example, the system 200 may track whether particular portions of content are played (e.g., watched) multiple times, and may track the start and end positions of those content portions that are watched multiple times.

Based on the monitoring, the system 200 collects viewing behavior analytics data for the content linked to by the content link (604). For example, based on the monitoring, the system 200 may collect fast forwarding, rewinding, playing, and other behavior data for the content linked to by the particular content link, where the fast forwarding, rewinding, and playing behavior data includes data indicating portions of the content where users tend to fast forward the content, portions of the content where users tend to rewind the content, and portions of the content where users tend to play the content. Portions of content may be indicated, for example, by a portion start time and a portion end time. Viewing behavior analytics data may be stored in association with the content link. That is, data may be stored so that viewing behavior analytics data collected for all users for a particular content link may be retrieved.

The system 200 automatically creates one or more hot indices for the content linked to by the content link based on the viewing behavior analytics data, where each of the one or more hot indices points to a different position within the content linked to by the content link (606). For example, the system 200 may automatically create, without human intervention, one or more hot indices for the content linked to by the particular content link based on the fast forwarding, rewinding, and playing behavior data. As a particular example, a hot index may be created to identify a position within the content where users transition from fast forwarding or rewinding the content to playing the content. For example, a hot index may be associated with a position in the content which corresponds to the end of a commercial, or to a particularly interesting point within the content, such as a sports highlight, or a highly interesting scene in a movie.

Hot indices may be created at a particular position for a content link if a certain threshold is reached. For example, if viewing behavior analytics data indicate that at least a certain number of users (e.g., one thousand) or at least a certain percentage of users (e.g., five percent) stop playback of content linked to by a content link at a particular position, then a hot index corresponding to that position might be created. Conversely, if less than a certain number or certain percentage of users stop playback of content at a particular position, then a hot index corresponding to that position might not be automatically created.

The system 200 stores, in association with the content link and for each of the one or more automatically created hot indices, timing data that indicates the position within the content pointed to by the corresponding hot index (608). For example, timing data for a hot index can include hour, minute, and second values which collectively indicate a position within the content associated with the hot index. Timing data for each hot index associated with a content link may be stored in association with the content link in a database, such as in a content and directory database.

Returning to FIG. 4, the system 200 determines a content preview file to associate with at least one of the multiple content links included in the channel associated with the content curator (404). A content preview file may be, for example, a subset of the content file linked to a content link (e.g., the first thirty seconds of the content file) or the content preview file may be a different file having different content than the content file linked to by the content link. As another example, a content preview file may be an image file. Content preview files are discussed in more detail below with respect to FIGS. 7 and 8.

Figure 7:
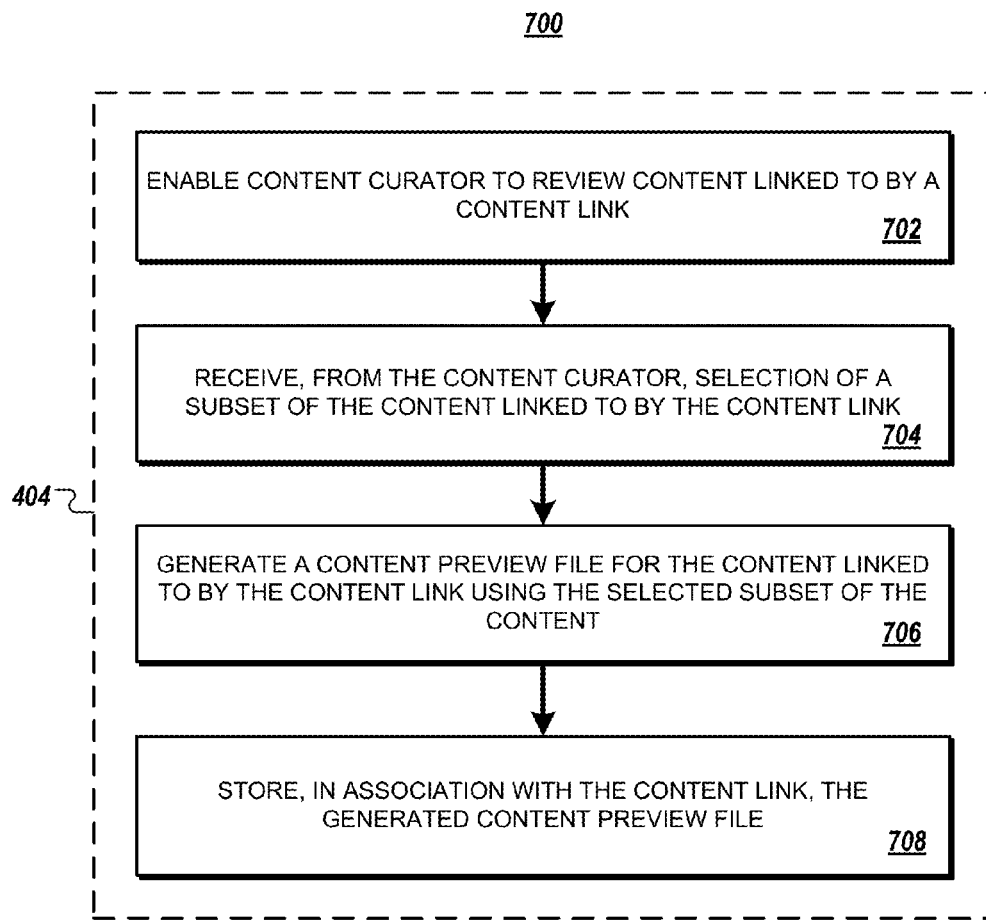

FIG. 7 illustrates a process 700 for determining preview content. The process 700 may be used in determining a content preview file referenced above with respect to reference numeral 404. The operations of the process 700 are described generally as being performed by the system 200. The operations of the process 700 may be performed by one of the components of the system 200 (e.g., the server system 210) or may be performed by a combination of the components of the system 200. In some implementations, operations of the process 700 may be performed by one or more processors included in one or more electronic devices.

The system 200 enables a content curator to review content linked to by a content link (702). For example, the content curator may review content using a media player application which is capable of playing multiple types of content (e.g., various types of video content, music content). The media player application may be part of or may be accessed through a content curator portal. The content curator may use the media player application to play the content linked to by the content link, as well as to stop, fast forward, rewind, and restart the content. The content may be viewed online (e.g., in a streaming format), or some or all of the content may be downloaded before viewing by the content curator. Some content may be retrieved from a content and directory database prior to being viewed.

The system 200 receives, from the content curator, selection of a subset of the content linked to by the content link (704). For example, the content curator may play (e.g., watch) the content in a media player application and may define a subset of the content by selecting begin time and end time values which indicate the start and end, respectively, of the content subset. For example, the content curator may watch the content and may stop or pause the content playback when the desired start time of the content subset is reached. The content curator may, for example, indicate that the position within the content at which the playback was paused is the start time of the content subset by selecting a "define start time" control (e.g., menu, button) of the media player application. The content curator may fast forward and/or resume playback of the content and may pause the content again when the desired end time of the content subset is reached. The content curator may, for example, indicate that the position within the content at which the playback is paused is the end time of the content subset by selecting a "define end time" control (e.g., button, menu) of the media player application.

The system 200 generates a content preview file for the content linked to by the content link using the selected subset of the content (706). For example, a new content file may be created by copying a subset of a content file linked to by the content link to a newly created content file. The content curator may create a new content file based on a content subset by using a media player application or another application.

The system 200 stores, in association with the content link, the generated content preview file (708). For example, the content preview file may be stored as a "BLOB" data type in a database system, or the content preview file may be stored in a folder on the hard drive of a server (with a path to the content preview file stored in a database).

Figure 8:
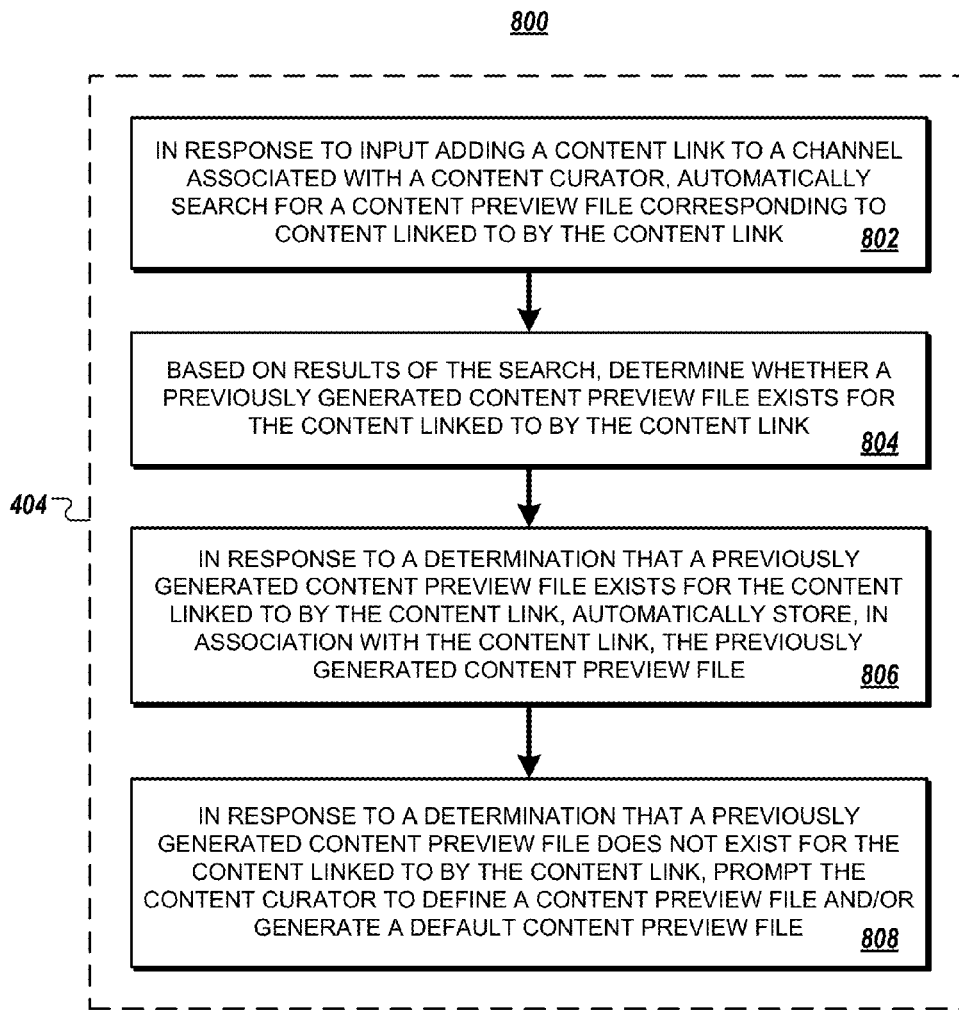

FIG. 8 illustrates a process 800 for determining preview content. The process 800 may be used in determining a content preview file referenced above with respect to reference numeral 404. The operations of the process 800 are described generally as being performed by the system 200. The operations of the process 800 may be performed by one of the components of the system 200 (e.g., the server system 210) or may be performed by a combination of the components of the system 200. In some implementations, operations of the process 800 may be performed by one or more processors included in one or more electronic devices.

In response to input adding a content link to a channel associated with a content curator, the system 200 automatically searches for a content preview file corresponding to content linked to by the content link (802). For instance, the system 200 may automatically search for a content preview file in response to the content curator adding a content link to a channel using a content curator portal. As one example, for movie content, the system 200 may automatically search for movie trailers or recorded movie reviews or interviews corresponding to the movie, such as by searching using the title of the movie. If a content preview file associated with the movie content is found (e.g., found on the Internet based on a movie title search), the content preview file may be downloaded and may be associated with the movie content as a preview content file for the movie content file. As another example, for music content, the system 200 may automatically search for music sample files or recorded interviews corresponding to the music content.

Based on results of the search, the system 200 determines whether a previously generated content preview file exists for the content linked to by the content link (804). For example, the system 200 may determine whether a movie trailer file, a music sample file, or another type of previously generated content preview file exists for the content.

In response to a determination that a previously generated content preview file exists for the content linked to by the content link, the system 200 automatically stores, in association with the content link, the previously generated content preview file (806). For example, the content preview file may be accessed from a remote server and a copy of the content preview file may be requested and copied to the server system 210. The copy of the content preview file may be stored as a BLOB data type in a database, or the copy of the content preview file may be stored in a file system folder of the server system 210. As another example, a link to the content preview file may be stored in a database (e.g., the content preview file itself might not be copied to the server system 210, but may be accessible through a stored link which points at the location of the content preview file on the remote server).

In response to a determination that a previously generated content preview file does not exist for the content linked to by the content link, the system 200 prompts the content curator to define a content preview file and/or generate a default content preview file (808). For example, the content curator may browse for and select a content preview file stored on a local or remote computing device (e.g., the content curator may select a preview content file which was not automatically located in reference to step 802 above). As another example, the content curator may input a link (e.g., URL) to a content preview file available on the Internet. The link may be, for example, a link to streaming content or a link to a content file.

The content curator may generate a content preview file for the content linked to by the content link. For example, the content curator may generate a content preview file by specifying a subset of the content linked to by the content link. For example, the content curator may watch (e.g., play) the content in a media player application and may specify a content subset by specifying start and end times within the content. For example, the content curator may watch the content file in the media player application and may pause or stop the content at the desired start time, select a control to indicate that the paused time is the subset start time, resume playback of the content, watch and/or fast forward the content until the desired subset end time is reached, pause or stop the content, and select a control to indicate that the paused time is the desired subset end time. As another example, the content curator may define a content subset to be a first portion (e.g., the first thirty seconds) of the content linked to by the content link. A content preview file may be generated by copying the content subset to a new content file.

The content curator may generate a content subset by combining multiple subsets of the content linked to by the content link. For example, the content curator may play the content in a media player application and may define multiple start and end times which define multiple content subsets. The content preview file may be generated, for example, by creating a new content file and appending each content subset to the newly created content file to create a compilation of content subsets. The content subsets may be appended to the content preview file in the order in which they appear in the content linked to by the content link, or the content curator may define an order in which the content subsets are to appear in the preview content file.

The content curator may generate a content preview file by combining content from multiple content files or sources. For example, a content curator may create a content preview file by combining any or all of previously existing content preview files, subsets of previously existing content preview files, subsets of the content linked to by the content link, subsets of other content files, and other content files.

In some implementations, a default content preview file may be automatically generated, without human intervention, in response to a determination that a previously generated content preview file does not exist for the content linked to by the content link. For example, a content preview file which includes the first thirty seconds of content may be automatically generated. The length of an automatically generated content preview file may be based on the type of content. For example, for movie content, a content preview file which includes the first minute of content may be generated, and for music content, a content preview file which includes the first thirty seconds of content may be generated. In some implementations, a default content preview file may be generated by the content curator, such as in response to a prompt, and the content curator may specify the length (e.g., thirty seconds, one minute) of the default content preview file.

Returning to FIG. 4, the system 200 determines metadata to associate with the channel generally and/or with at least one of the multiple content links included in the channel associated with the content curator (406). For example, the content curator may provide metadata information such as a channel name and a channel description using a content curator portal. The content curator may also provide notes and comments for one or more content links (e.g., the content curator may include a comment or a description for the content linked to by the content link). Metadata may include, among other things, the run length of the content, user and/or critic ratings and reviews of the content (e.g., either full text reviews or links to reviews), links to one or more websites associated with the content, and links to related content. Metadata may also include one or more keywords which describe or are representative of the channel, to help facilitate the finding of published channels in an end-user search portal.

The system 200 determines order information for arranging the multiple content links in the channel associated with the content curator (408). For example, the content curator may arrange content items using a content curator portal user interface. The user interface may display representations of available content items in an available content area of the user interface and may display a list of representations of content links included in a channel in a channel information area of the user interface. A representation of an available content item or content link may be, for example, an icon, a thumbnail, or a textual link. The content curator may arrange the representations of content links in the channel information area to define a desired order of content. For example, the content curator may drag and drop or otherwise reorder representations of content links in the channel information area of the user interface. The content curator may drag and drop or otherwise move a representation of an available content item from the available content area to the channel information area, placing the available content item in a desired position within the list of content links.

Returning to FIG. 3, the system 200 defines channel information for the channel associated with the content curator based on the multiple content links and the supplemental channel information (306). For example, referring to FIG. 4, the system 200 defines channel information for the channel associated with the content curator based on the multiple content links, the one or more hot indices, the content preview file, the metadata, and the order information (410).

The system 200 publishes the defined channel information at a channel link to make the channel information available to user devices of a content delivery network (308). For example, the defined channel information may be published using RSS (Really Simple Syndication) or similar technology. The channel link may be made available through an end-user content search portal. For example, the channel link may appear in one or more directory listings of available channels. The channel link may also be returned as a search result from searches performed through the end-user content search portal. Once a user has subscribed to a channel, channel information may be downloaded to a media player/downloader device of the user. In some implementations, channel information is downloaded in response to a user switching to a subscribed channel. In other implementations, channel information is downloaded to the media player/downloader device in response to the user subscription (e.g., possibly before the user views the channel for the first time).

Figure 9:
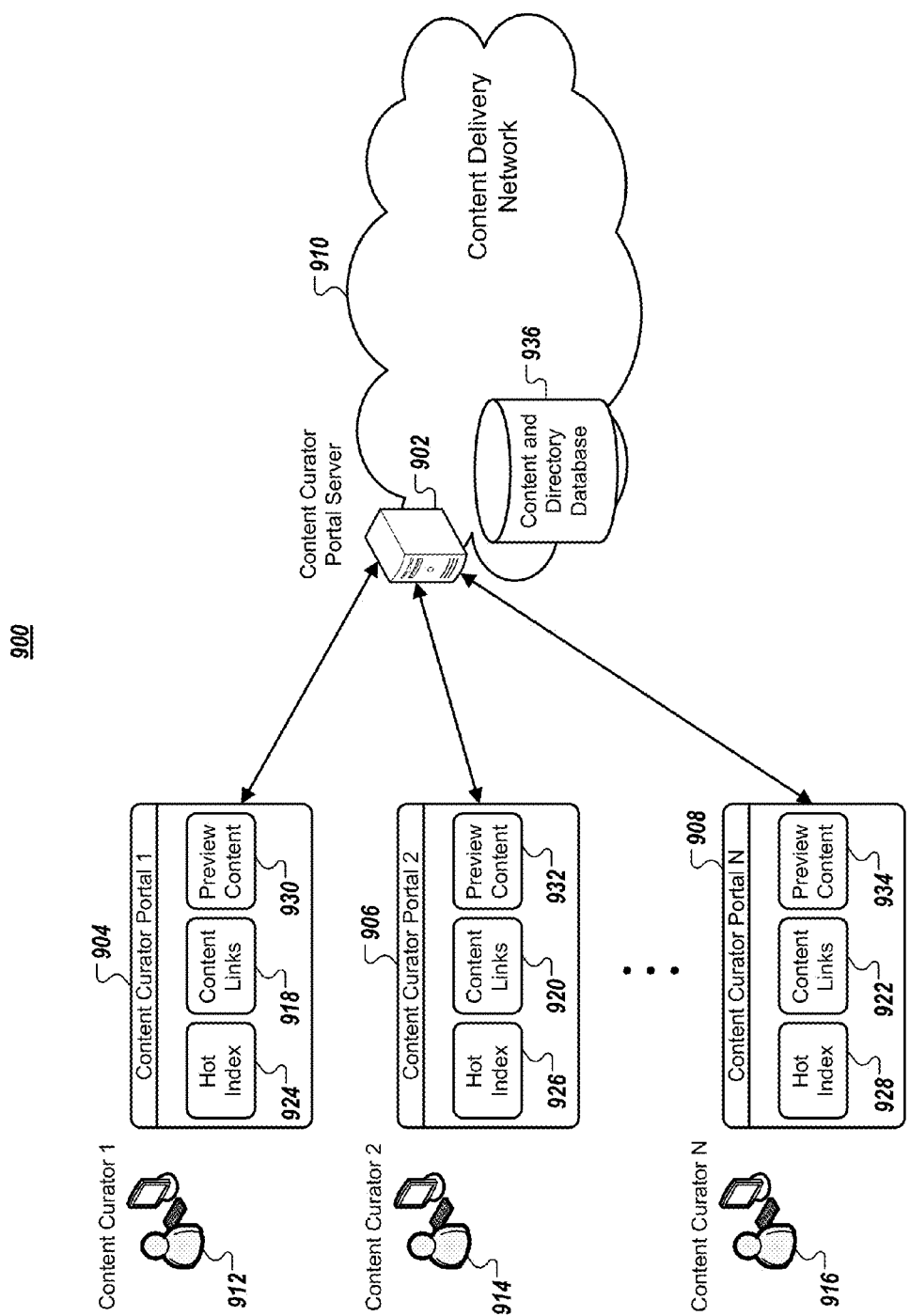

FIG. 9 illustrates an exemplary system 900 for defining channel information. The system 900 includes a content curator portal server 902 serving multiple content curator portal instances 904, 906, 908 over a content delivery network 910. Multiple content curators 912, 914, 916 use the multiple content curator portal instances 904, 906, 908, respectively. The multiple content curators 912, 914, 916 define, using the multiple content curator portal instances 904, 906, 908, respectively, content links 918, 920, 922, respectively, where each content link in the content links 918, 920, 922 is associated with a channel and includes an address at which content is made available over the content delivery network 910.

The multiple content curators 912, 914, 916 also define, using the multiple content curator portal instances 904, 906, 908, respectively, supplemental channel information which includes hot indices 924, 926, 928, respectively, and preview content 930, 932, 934, respectively. Supplemental channel information may also include metadata associated with a channel generally and/or metadata associated with one or more content links associated with a channel and may also include ordering information for arranging content links associated with a channel. A content curator 912, 914, 916 may define, using the respective content curator portal instances 904, 906, 908, channel information for a channel based on the respective content links 918, 920, 922 and based on respective supplemental channel information. Defined channel information may be sent to the content curator portal server 902 and may be stored in a content and directory database 936, in association with information identifying the respective content curator 912, 914, 916.

FIG. 10 illustrates an exemplary channel definition 1000. The channel definition 1000 may be associated with a particular content curator, such as a content curator named "DJ". The channel definition 1000 includes a channel name 1002 of "My DJ Channel" and a channel link 1004 of "http://9x9.tv/channels/rssfeed123456.html". The channel link 1004 makes the channel definition 1000 available to user devices of a content delivery network. The channel definition 1000 also includes metadata 1006. The metadata 1006 is data that is generally associated with the channel defined by the channel definition 1000.

Metadata and other supplemental channel information may also be associated with one or more content links. The channel definition 1000 includes multiple content links 1008-1018, as shown in a table 1020. Each content link 1008-1018 includes an address at which content is made available over a content delivery network. Each content link 1008-1018 may refer, for example, to a URL of a content file or to a BitTorrent™ torrent file. For example, the content link 1018 refers to the URL "http://www.broadcasterA.com/watch/show1-episode4" and the content link 1012 refers to the BitTorrent™ torrent file address of "http://www.nonprofitA.org/download/fileB.torrent".

As shown in columns 1022, 1024, 1026 of table 1020, each content link 1008-1018 may have one or more associated hot indices, one or more associated content preview files, or associated metadata, respectively. Hot indices may be automatically identified based on user viewing behavior data, or may be manually identified by a content curator. Each hot index refers to a position within a respective content item (e.g., content file). For example, the content link 1008 has associated hot indices corresponding to positions of one minute twenty seconds, three minutes thirty seconds, and four minutes thirty seconds within the content linked to by the content link 1008. As another example, the content link 1014 has one associated hot index corresponding to a position of zero minutes, forty seconds within the content linked to by the content link 1014. Some content links, such as content link 1016, have no associated hot indices.

The content link 1008 has an associated content preview file named "myChannel1.wmv". Content preview files may be generated automatically (e.g., as the first portion of an associated content file), may be generated manually by a content curator, or may be selected from existing content preview files (e.g., a movie trailer). Some content links, such as content links 1012 and 1016, do not have associated content preview files.

Content links may have associated metadata. For example, as shown in column 1026, the content link 1012 has metadata describing the content linked to by the content link 1012. Metadata associated with a content link may be distinguished from metadata which is generally associated with the channel and not specifically associated with a content link, such as metadata 1006.

Figure 11:
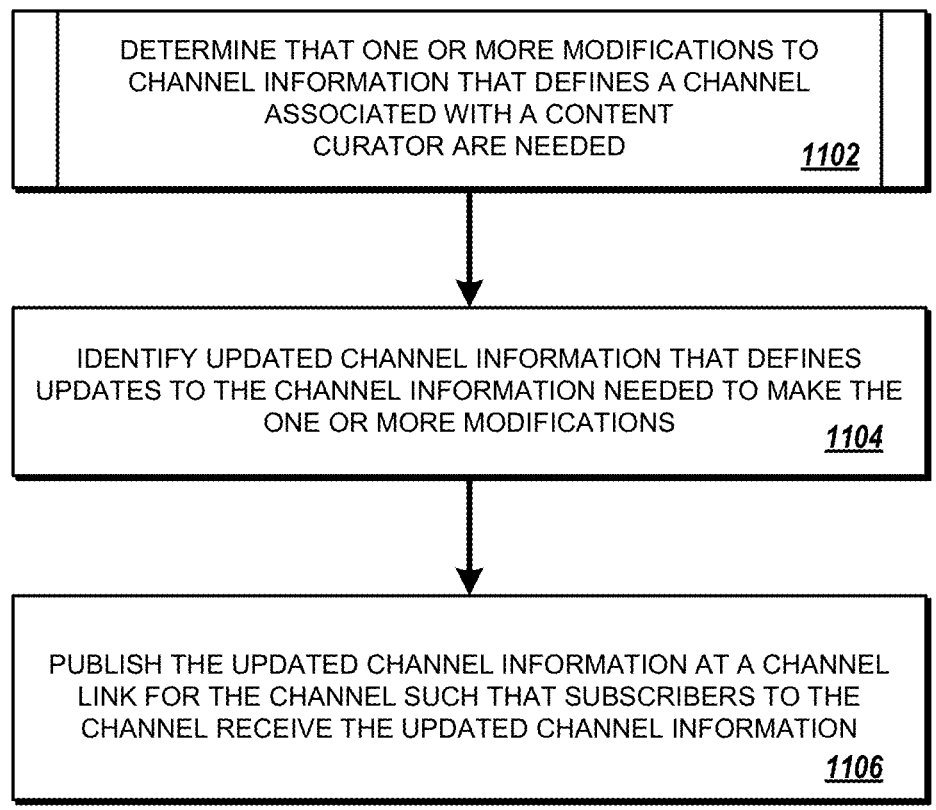

FIG. 11 illustrates a process 1100 for updating channel information. The operations of the process 1100 are described generally as being performed by the system 200. The operations of the process 1100 may be performed by one of the components of the system 200 (e.g., the server system 210) or may be performed by a combination of the components of the system 200. In some implementations, operations of the process 1100 may be performed by one or more processors included in one or more electronic devices.

The system 200 determines that one or more modifications to channel information that defines a channel associated with a content curator are needed (1102). For example, the system 200 may determine that modifications to one or more content links, hot indices, content preview files, or other supplemental channel information are needed. The system 200 may determine automatically, without human intervention, that modifications are needed, or the system 200 may determine that modifications are needed based on a received input from a content curator. Determining that modifications to channel information are needed is described in more detail below with respect to FIGS. 12 and 14.

Figure 12:
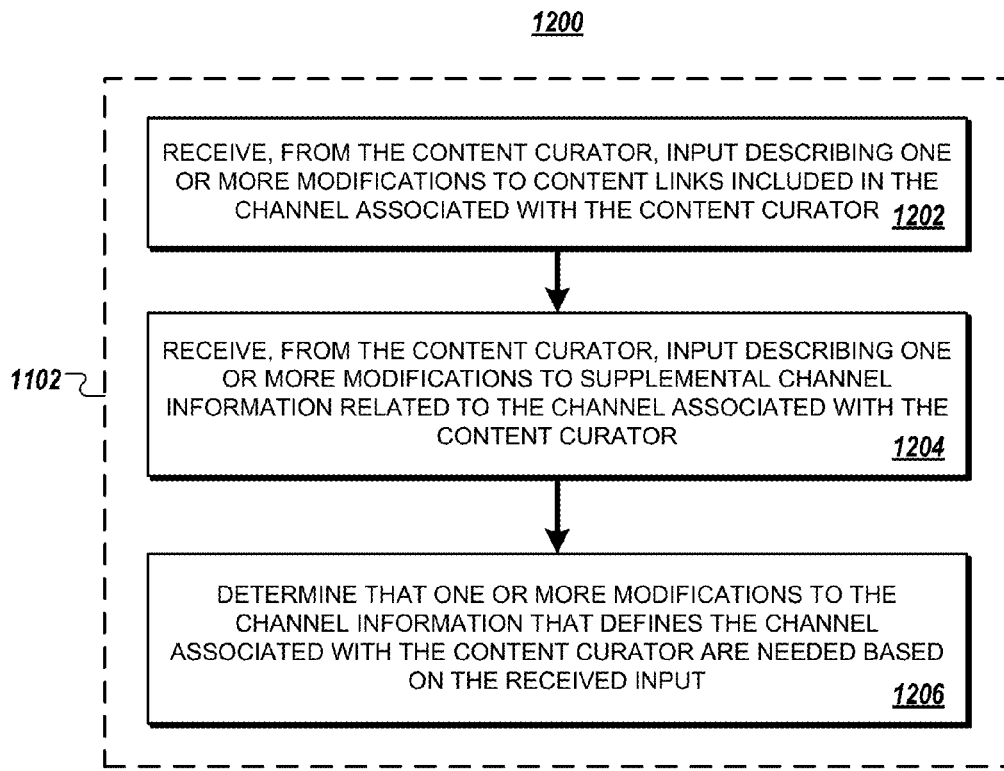

FIG. 12 illustrates a process 1200 for determining that one or more modifications to channel information that defines a channel associated with a content curator are needed. The process 1200 may be used in determining that one or more modifications to channel information are needed referenced above with respect to reference numeral 1102. The operations of the process 1200 are described generally as being performed by the system 200. The operations of the process 1200 may be performed by one of the components of the system 200 (e.g., the server system 210) or may be performed by a combination of the components of the system 200. In some implementations, operations of the process 1200 may be performed by one or more processors included in one or more electronic devices.

Figure 13:
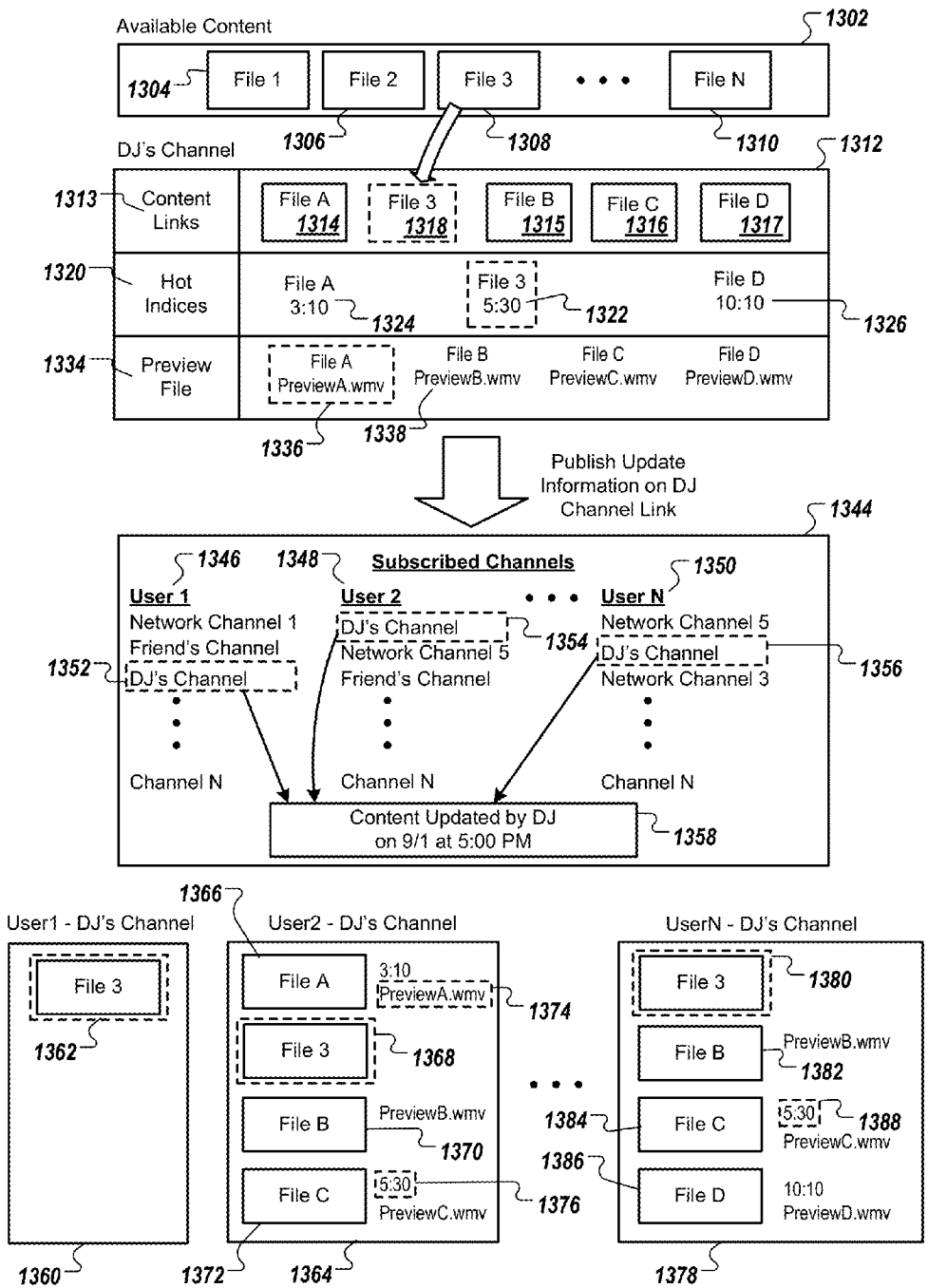
FIG. 13 illustrates an example of manual channel information modifications.

The system 200 receives, from the content curator, input describing one or more modifications to content links included in the channel associated with the content curator (1202). For example, a content curator may add a new content link to a channel, may edit an existing content link (e.g., update the link address), or may delete a content link from a channel. For example, FIG. 13 illustrates an available content user interface area 1302 which displays content which is available to be added to a channel. The user interface 1302 may be displayed, for example, on a content curator portal. The available content user interface 1302 displays available content file representations 1304-1310. For example, the representations 1304-1310 may be icons or thumbnail images.

The available content user interface area 1302 may be displayed on a content curator portal along with a channel definition area 1312. The content curator may use the channel definition area 1312 to define and/or modify a channel definition. For example, the channel definition area 1312 is displaying a channel definition for a channel named "DJ's Channel". To add a new content link to a channel, the content curator may drag an available file representation 1304-1310 and drop it onto a content links area 1313 of the channel definition area 1312. The content links area 1313 includes representations 1314-1317 of content links which are currently included in the channel. The content curator may, for example, drag the representation 1308 of a "File 3" content item and drop it onto the content links area 1313, between the representations 1314 and 1315, as illustrated by a dashed-line representation 1318. The dragging and dropping of the representation 1308 results in the adding of a new content link to the channel and also in a modification of the positions of the content links currently in the channel. The content curator may select a representation 1314-1318 to delete or to modify an existing content link.

Returning to FIG. 12, the system 200 receives, from the content curator, input describing one or more modifications to supplemental channel information related to the channel associated with the content curator (1204). For example, the content curator may add, edit, or delete one or more hot indices, preview content files, or metadata for a channel, or the content curator may reorder content links for a channel. For example and as illustrated in FIG. 13, the content curator may use a hot index area 1320 of the channel definition user interface area 1312 to add a new hot index 1322 for a "File 3" content link, to delete a hot index 1324 for a "File A" content link, or to edit a hot index 1326 for a "File D" content link.

As another example, the content curator may use a preview file area 1334 to add a new content preview file (e.g., corresponding to representation 1336) for the "File A" content link, or to delete a content preview file (e.g., corresponding to representation 1338) for the "File B" content link. In some implementations, the content curator portal allows a content curator to edit an existing content preview file (e.g., to edit a video, audio, or image file). In other implementations, to effectively edit an existing content preview file, the content curator may delete the existing content preview and add a new content preview file which includes the desired changes.

Returning to FIG. 12, the system 200 determines that one or more modifications to the channel information that defines the channel associated with the content curator are needed based on the received input (1206). For instance, in the example of FIG. 13, the system may determine that one or more modifications to the "DJ's Channel" channel are needed based on the content curator interacting with the channel definition user interface area 1312.

Figure 14:
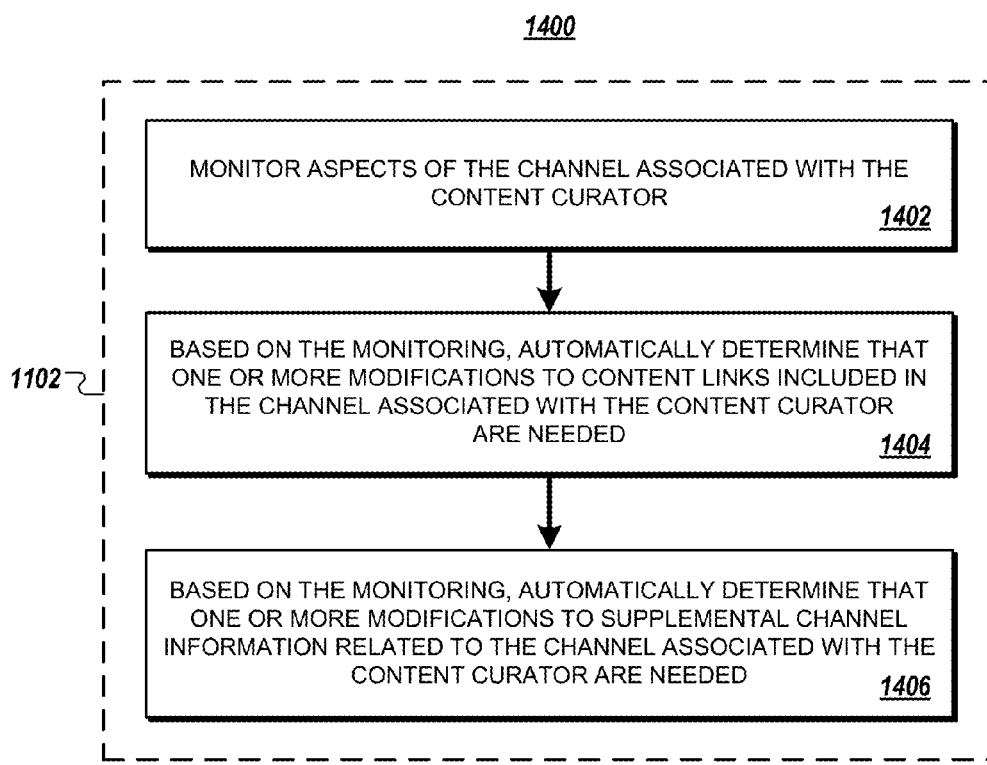

FIG. 14 illustrates a process 1400 for determining that one or more modifications to channel information that defines a channel associated with a content curator are needed. The process 1400 may be used in determining that one or more modifications to channel information are needed referenced above with respect to reference numeral 1102. The operations of the process 1400 are described generally as being performed by the system 200. The operations of the process 1400 may be performed by one of the components of the system 200 (e.g., the server system 210) or may be performed by a combination of the components of the system 200. In some implementations, operations of the process 1400 may be performed by one or more processors included in one or more electronic devices.

The system 200 monitors aspects of the channel associated with the content curator (1402). For example, the system 200 may monitor, without human intervention, aspects of content links and supplemental channel information associated with the channel. The system 200 may automatically detect aspects of the channel, such as broken or changed content links, newly-created hot indices, and newly-available content preview files. Monitoring aspects of content links and supplemental channel information is described in more detail below with respect to FIG. 15.

Figure 15:
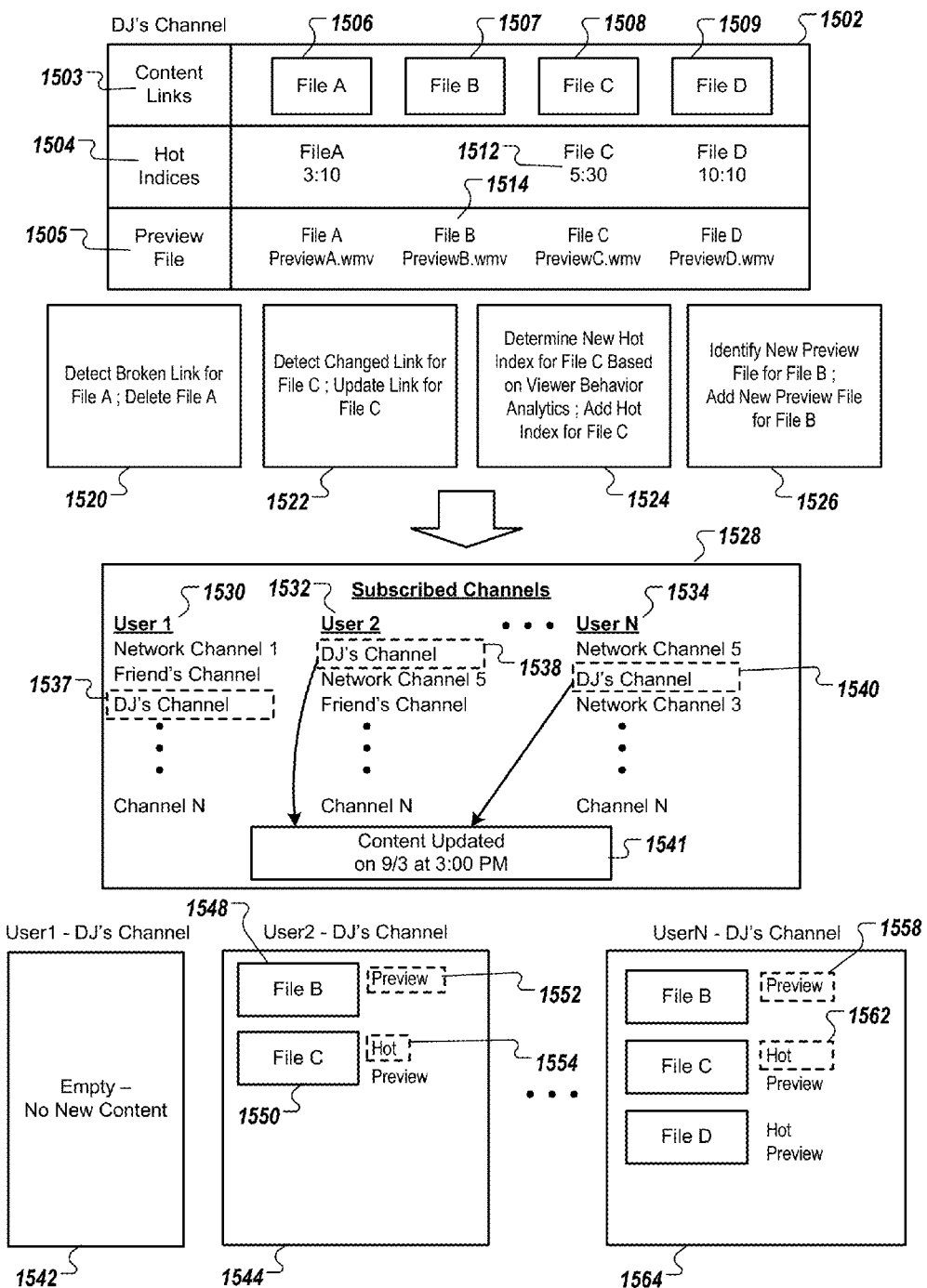
FIG. 15 illustrates an example of automatic detection of needed channel information modifications.

FIG. 15 illustrates a channel definition area 1502 for a channel named "DJ's Channel". The channel definition area 1502 includes a content links area 1503, a hot indices area 1504, and a content preview area 1505. The content links area 1503 includes representations 1506-1509 for content links currently included in the channel.

The system 200 may automatically detect, for example, that the content link for "File A" (e.g., corresponding to representation 1506) is a broken link (e.g., that "File A" is no longer accessible at the specified content link). The system 200 may also detect, for example, that the content link for "File C" (e.g., corresponding to representation 1508) has changed (e.g., that the "File C" is still accessible, but is accessible at a different link address). As another example, the system 200 may determine that a new hot index 1512 has been automatically generated for "File C", based on viewer behavior analytics. For example, automatic monitoring of user viewing behavior may have determined that users frequently stop rewinding the "File C" content at a position of 5:30 and the system 200 may determine that a new hot index corresponding to position 5:30 of "File C" has been created. As yet another example of automatic monitoring of channel aspects, the system 200 may detect that a new content preview file 1514 is available for "File B" (e.g., the content link corresponding to representation 1507). For example, "File B" may be movie content and a new movie trailer may have been made available and discovered by the system 200.

Returning to FIG. 14, based on the monitoring, the system 200 automatically determines that one or more modifications to content links included in the channel associated with the content curator are needed (1404). For instance, in the example of FIG. 15, the system 200 may determine that a deletion modification 1520 of the content link associated with representation 1506 is needed based on the detection of a broken link for "File A". As another example, the system 200 may determine that an update-link modification 1522 is needed for the content link associated with representation 1508 based on the detection of the modified link for "File C".

Based on the monitoring, the system 200 automatically determines that one or more modifications to supplemental channel information related to the channel associated with the content curator are needed (1406). For instance, in the example of FIG. 15, the system 200 may determine that an add-hot-index modification 1524 is needed based on the determination that a new hot index has been created for "File C". As another example, the system 200 may determine that an add-content-preview-file modification 1526 is needed based on the detected availability of a new content preview file for "File B".

Returning to FIG. 11, the system 200 identifies updated channel information that defines updates to the channel information needed to make the one or more modifications (1104). For instance, in the example of FIG. 13, the system 200 may identify the newly-added content link for "File 3" associated with the representation 1308, the newly-added content preview file 1336 for "File A", the newly-added hot index 1322 for "File 3", the deletion of the hot index 1324 for "File A", the modification of the hot index 1326 for "File D", and the deletion of the content preview file 1338 for "File B". In the example of FIG. 15, the system 200 may identify the delete link modification 1520, the update link modification 1522, the add hot index modification 1524, and the add new content preview file modification 1526. The updated channel information may include only the information related to the channel that has changed.

The system 200 publishes the updated channel information at a channel link for the channel such that subscribers to the channel receive the updated channel information (1106). For example, the updated channel information may be published using RSS or similar technology. Updated channel information may be automatically downloaded to media player/downloader devices of users who have subscribed to the channel. Downloaded channel information for an update may include only information related to modified channel information (e.g., downloaded channel information for an update may not include information for channel information that has not changed).

A user may receive an update message subsequent to a media player/downloader device receiving updated channel information. For instance, in the example of FIG. 13, channel lists 1346-1350 for users one, two, and "N", respectively, each include the "DJ's Channel" channel (as shown by channel indicators 1352-1356) which the content curator modified using the user interface 1312. In response to the modifications to the channel, updated channel information may be downloaded to the media player/downloader devices for user one, user two, and user "N". Each of the users one, two, and "N" may see an update message 1358 the next time they use their media player/downloader device which indicates that "DJ's Channel" has been updated.

Whether a user sees update messages or other update indicators may depend on whether a user has already watched content related to channel updates. For instance, in the example of FIG. 13, the "DJ's Channel" channel has current content associated with "File A", "File 3", "File B", "File C", and "File D", with the "File 3" content recently added. Suppose that user one has already watched the "File A", "File B", "File C", and "File D" content. An updated content list 1360 for the "DJ's Channel" channel for user one shows a single representation 1362 corresponding to the recently added "File 3" content. The representation 1362 is highlighted (e.g., with a dashed line) to indicate that it represents newly-added content. User one does not receive notification related to the new hot index associated with the "File C" content or the new content preview file associated with the "File A" content, since user one has already watched the "File C" and "File A" content.

Although user one has watched "File A", "File B", and "File C", those content files may or may not be deleted from the media player/downloader device associated with user one. For example, the content list 1360 may be a content list which shows unwatched shows for the associated channel. In general, in some implementations, a content file may be deleted after a user has finished viewing the content file (possibly based on a user preference). In some implementations, a content file may be deleted after being viewed and after the content expires. In other implementations, content files are deleted only if a user issues an explicit request to delete a content file.

Suppose that user two has not watched any of the "File A", "File B", "File C", or "File D" content. After receiving updated channel information, a content list 1364 for user two may display representations 1366-1372 for the "File A", "File 3", "File B", and "File C" content, respectively. A representation for the "File D" content may be available, for example by scrolling. The representation 1368 for the "File 3" content is highlighted to indicate that it represents newly-added content. A representation 1374 of a recently-added preview file for "File A" and a representation 1376 of a recently-added hot index for "File C" may appear highlighted, to indicate that the corresponding supplemental channel information is new.

As another example, suppose that user "N" has watched "File A" but has not watched "File B", "File C", or "File D". A content list 1378 for user "N" may include representations 1380-1386, corresponding to the "File 3", "File B", "File C", and "File D" content, respectively. The representation 1380 for the "File 3" content is highlighted to indicate that it represents newly-added content. The channel list 1378 does not include a representation for "File A" or a notification of the new content preview file for "File A" since user "N" has already watched "File A". A representation 1388 for the recently-added hot index for "File C" is highlighted, to indicate that the corresponding hot index is new.

A user may also be updated in response to updates to channel information which are automatically determined (e.g., in contrast to channel information updates initiated by a content curator). For instance, in the example of FIG. 15, channel lists 1530-1534 for users one, two, and "N", respectively, each include the "DJ's Channel" channel (as shown by channel indicators 1537-1540). Assume that modifications 1520-1526 have been previously automatically determined, based on monitoring of aspects of the channel. In response to the modifications 1520-1526, updated channel information may be downloaded to the media player/downloader devices for user one, user two, and user "N". The users two, and "N" may see an update message 1541 the next time they use their media player/downloader device which indicates that "DJ's Channel" has been updated.

Suppose, similar to the user one, user two, and user "N" viewing behavior in the example of FIG. 13, that user one has already watched the "File A", "File B", "File C", and "File D" content (a content list 1542 for user one is correspondingly empty). In such a scenario, user one might not see the update message 1541 or see any notifications related to the modifications 1520-1526, since the updates are applicable to content that user one has already seen. Also, in some examples, update messages may generally be displayed only if certain types of updates occur (e.g., new or deleted content links) and may not be shown if only certain other types of updates occur (e.g., if the only types of updates that have occurred are modifications to supplemental channel information, update messages might not be displayed).

Suppose, in the example of FIG. 15, that prior to the updates 1520-1526, that user two has watched the "File D" content but has not watched any of the "File A", "File B", or "File C" content. A content list 1544 may correspondingly display representations 1548 and 1550 for the "File B" and "File C" content, respectively. A representation for "File A" is not shown, due to the modification 1520. The representation 1550 for "File C" might not be highlighted, despite the update-link modification 1522. For example, the update-link modification might not be deemed of interest to the user (e.g., the "File C" content is still available, and the user may not be interested in the fact that the link is available at a different link address). A representation 1552 of a recently-added preview file for "File B" (e.g., corresponding to modification 1526) and a representation 1554 of a recently-added hot index for "File C" (e.g., corresponding to modification 1524) may appear highlighted, to indicate that the corresponding supplemental channel information is new. Similarly, representations 1558 and 1562, corresponding to the recently-added preview file for "File B" (e.g., modification 1526) and the recently-added hot index for "File C" (e.g., modification 1524) may appear highlighted in a content list 1564 for user "N". The content list 1564 does not include a representation for "File A", due to modification 1520.

As another example of defining a channel, in some implementations, a first user may subscribe to a channel associated with a second user. For example, the second user may send a content item or a link to a content item to the first user, such as by sending an electronic communication (e.g., email) addressed to a communications address associated with the media player/downloader device of the first user. In response to receiving an electronic communication from the second user, the media player/downloader device of the first user (or, as other examples, a server device, or a remote control device associated with the first user) may extract the content from the communication (e.g., by downloading content through a link included in the communication, extracting content attached to the communication, or downloading content using download information (e.g., a BitTorrent™ torrent file) included in the communication, to name a few examples).

After content has been extracted, the content may be organized in a channel associated with the second user. The first user may watch the content items received from the second user, in a manner similar to watching content files included on a channel defined by a content curator. In some implementations, the second user in this example is a content curator. In some implementations, the second user is not a defined content curator, but is a regular user who has subscribed to the system. For example, the first user and second user may be friends or may belong to the same family. For example, a first user sending content to a second user with the received content being organized into a channel for the second user may be a convenient way for the second user to share content with the first user and possibly with other users (e.g., the second user may send electronic communication to a group of users).

Figure 16:
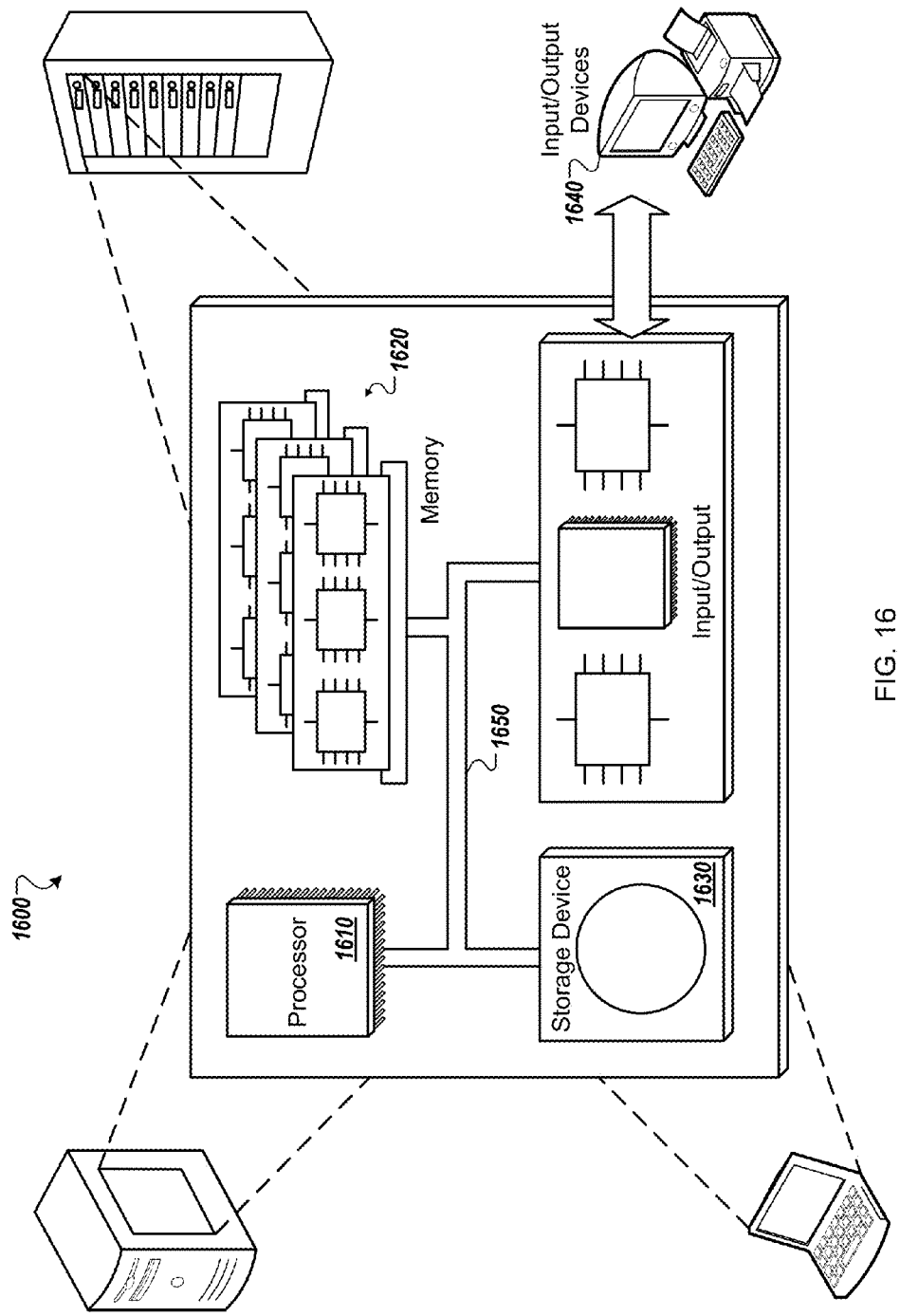

FIG. 16 is a schematic diagram of an example of a generic computer system 1600. The system 1600 can be used for the operations described in association with the processes 300, 400, 500, 600, 700, 800, 1100, 1200, and 1400, according to one implementation. For example, the system 1600 may be included in either or all of the server system 210 and the server 216.

The system 1600 includes a processor 1610, a memory 1620, a storage device 1630, and an input/output device 1640. Each of the components 1610, 1620, 1630, and 1640 are interconnected using a system bus 1650. The processor 1610 is capable of processing instructions for execution within the system 1600. In one implementation, the processor 1610 is a single-threaded processor. In another implementation, the processor 1610 is a multi-threaded processor. The processor 1610 is capable of processing instructions stored in the memory 1620 or on the storage device 1630 to display graphical information for a user interface on the input/output device 1640.

The memory 1620 stores information within the system 1600. In one implementation, the memory 1620 is a computer-readable medium. In one implementation, the memory 1620 is a volatile memory unit. In another implementation, the memory 1620 is a non-volatile memory unit.

The storage device 1630 is capable of providing mass storage for the system 1600. In one implementation, the storage device 1630 is a computer-readable medium. In various different implementations, the storage device 1630 may be a floppy disk device, a hard disk device, an optical disk device, or a tape device.

The input/output device 1640 provides input/output operations for the system 1600. In one implementation, the input/output device 1640 includes a keyboard and/or pointing device. In another implementation, the input/output device 1640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A method of providing channel information to users of a content delivery network, the method comprising:
   receiving, from a content curator, input defining multiple content links to include in a channel associated with the content curator, each content link including an address at which content is made available over a network;
   determining, using a network server system, supplemental channel information that facilitates user experience of content linked to by at least one of the multiple content links;
   defining, using the network server system, channel information for the channel associated with the content curator based on the multiple content links and the supplemental channel information;
   publishing, using the network server system, the defined channel information at a channel link for the channel associated with the content curator to make the defined channel information available to user devices of a content delivery network, the channel link being a network address at which the defined channel information is made available to the user devices of the content delivery network;
   determining, using the network server system, that one or more modifications to the channel information that defines the channel associated with the content curator are needed;
   in response to the determination that one or more modifications to the channel information that defines the channel associated with the content curator are needed, identifying, using the network server system, updated channel information that defines updates to the channel information needed to make the one or more modifications;
   publishing, using the network server system, the updated channel information at the channel link for the channel associated with the content curator such that user devices of subscribers to the channel associated with the content curator receive the updated channel information through the channel link;
   determining whether a user has already experienced all content impacted by the updated channel information;
   based on a determination that the user has not already experienced all content impacted by the updated channel information, providing an update message to indicate the updated channel information; and
   based on a determination that the user has already experienced all content impacted by the updated channel information, withholding the update message.

2. The method of claim 1 wherein:
   determining, using the network server system, supplemental channel information that facilitates user experience of content linked to by at least one of the multiple content links comprises determining, using the network server system, metadata to associate with the channel generally and metadata to associate at least one of the multiple content links included in the channel associated with the content curator; and defining, using the network server system, channel information for the channel associated with the content curator comprises defining, using the network server system, channel information for the channel associated with the content curator based on the multiple content links and the metadata to associate with the channel generally and the metadata to associate at least one of the multiple content links included in the channel associated with the content curator.

3. The method of claim 1 wherein:

determining, using the network server system, supplemental channel information that facilitates user experience of content linked to by at least one of the multiple content links comprises determining, using the network server system, order information for arranging the multiple content links in the channel associated with the content curator; and defining, using the network server system, channel information for the channel associated with the content curator comprises defining, using the network server system, channel information for the channel associated with the content curator based on the multiple content links and the determined order information for arranging the multiple content links in the channel associated with the content curator.

4. The method of claim 1 further comprising:

determining, using the network server system, that one or more modifications to the channel information that defines the channel associated with the content curator are needed;

in response to the determination that one or more modifications to the channel information that defines the channel associated with the content curator are needed, identifying, using the network server system, updated channel information that defines updates to the channel information needed to make the one or more modifications; and publishing, using the network server system, the updated channel information at the channel link for the channel associated with the content curator such that user devices of subscribers to the channel associated with the content curator receive the updated channel information through the channel link.

5. The method of claim 4 wherein determining, using the network server system, that one or more modifications to the channel information that defines the channel associated with the content curator are needed comprises:

receiving, from the content curator, input describing one or more modifications to content links included in the channel associated with the content curator; and determining that one or more modifications to the channel information that defines the channel associated with the content curator are needed based on the received input describing one or more modifications to content links included in the channel associated with the content curator.

6. The method of claim 4 wherein determining, using the network server system, that one or more modifications to the channel information that defines the channel associated with the content curator are needed comprises:

receiving, from the content curator, input describing one or more modifications to supplemental channel information related to the channel associated with the content curator; and determining that one or more modifications to the channel information that defines the channel associated with the content curator are needed based on the received input describing one or more modifications to supplemental channel information related to the channel associated with the content curator.

7. The method of claim 4 wherein determining, using the network server system, that one or more modifications to the channel information that defines the channel associated with the content curator are needed comprises:

electronically monitoring, without human intervention, aspects of the channel associated with the content curator; and based on the monitoring, automatically, without human intervention, determining that one or more modifications to content links included in the channel associated with the content curator are needed.

8. The method of claim 4 wherein determining, using the network server system, that one or more modifications to the channel information that defines the channel associated with the content curator are needed comprises:

electronically monitoring, without human intervention, aspects of the channel associated with the content curator; and based on the monitoring, automatically determining, without human intervention, that one or more modifications to supplemental channel information related to the channel associated with the content curator are needed.

9. The method of claim 4 wherein publishing, using the network server system, the updated channel information at the channel link for the channel associated with the content curator such that user devices of subscribers to the channel associated with the content curator receive the updated channel information through the channel link comprises publishing, using the network server system, only the updated channel information at the channel link for the channel associated with the content curator such that user devices of subscribers to the channel associated with the content curator that previously received the defined channel information receive only the updated channel information through the channel link.

10. The method of claim 1 wherein receiving, from the content curator, input defining multiple content links to include in the channel associated with the content curator further comprises receiving, from the content curator, input defining a first link to streaming content, the first link including a first address at which content is streamed over a network to user devices.

11. The method of claim 10:

wherein receiving, from the content curator, input defining multiple content links to include in the channel associated with the content curator further comprises receiving, from the content curator, input defining a second link to downloadable content, the second link including a second address at which content is available to be downloaded over a network by user devices; and wherein publishing, using the network server system, the defined channel information at the channel link for the channel associated with the content curator further comprises publishing, using the network server system, the defined channel information that includes the first link and the second link such that the channel associated with the content curator includes the streaming content linked to by the first link and the downloadable content linked to by the second link.

12. The method of claim 5:
wherein receiving, from the content curator, input describing one or more modifications to content links included in the channel associated with the content curator comprises receiving, from the content curator, input adding a new content link to the channel associated with the content curator; and
wherein determining that one or more modifications to the channel information that defines the channel associated with the content curator are needed based on the received input describing one or more modifications to content links included in the channel associated with the content curator comprises determining that the new content link needs to be added to the channel information that defines the channel associated with the content curator based on the received input adding the new content link to the channel associated with the content curator.

13. The method of claim 12:
wherein receiving, from the content curator, input adding the new content link to the channel associated with the content curator comprises receiving, from the content curator, input adding the new content link at a position between content links which are currently included in the channel; and
wherein determining that the new content link needs to be added to the channel information that defines the channel associated with the content curator based on the received input adding the new content link to the channel associated with the content curator comprises determining that the channel information needs to be updated to include the new content link and reorder the content links currently in the channel.

14. The method of claim 13, wherein receiving, from the content curator, input adding the new content link at a position between content links which are currently included in the channel comprises:
providing, on a content curator portal, an available content user interface area that includes representations of available content items along with a channel definition area that includes a channel definition for the channel associated with the content curator; and
receiving input dragging a representation of a content item from the available content user interface area and dropping the representation of the content item between representations of content items in the channel definition area for the channel associated with the content curator.

15. The method of claim 7:
wherein electronically monitoring, without human intervention, aspects of the channel associated with the content curator comprises detecting, without human intervention, a broken content link in the multiple content links; and
wherein automatically, without human intervention, determining that one or more modifications to content links included in the channel associated with the content curator are needed comprises automatically, without human intervention, determining to remove the broken content link from the channel.

16. The method of claim 7:
wherein electronically monitoring, without human intervention, aspects of the channel associated with the content curator comprises detecting, without human intervention, a first content link in the multiple content links that has a changed address; and wherein automatically, without human intervention, determining that one or more modifications to content links included in the channel associated with the content curator are needed comprises automatically, without human intervention, determining to update the first content link based on the changed address.

17. The method of claim 8:
wherein electronically monitoring, without human intervention, aspects of the channel associated with the content curator comprises determining that a new hot index has been automatically generated for a content item included in the channel based on viewer behavior analytics; and
wherein automatically determining, without human intervention, that one or more modifications to supplemental channel information related to the channel associated with the content curator are needed comprises automatically determining, without human intervention, that the new hot index needs to be added to the supplemental channel information.

18. The method of claim 8:
wherein electronically monitoring, without human intervention, aspects of the channel associated with the content curator comprises determining that a new content preview file has been made available by a publisher of a content item included in the channel; and
wherein automatically determining, without human intervention, that one or more modifications to supplemental channel information related to the channel associated with the content curator are needed comprises automatically determining, without human intervention, that the new content preview file needs to be added to the supplemental channel information.

19. The method of claim 1, wherein providing the update message to indicate the updated channel information comprises providing an update message that indicates which channel was updated and a date and time when the channel was updated by the content curator.

20. The method of claim 1, wherein providing the update message to indicate the updated channel information comprises:
determining a type of update that has occurred to the channel information;
determining whether the type of update that has occurred to the channel information is one of certain types of updates that result in update messages being shown; and
providing the update message conditioned on determining that the type of update that has occurred to the channel information is one of the certain types of updates that result in update messages being shown.

21. A system comprising:
at least one computer; and
at least one computer-readable medium coupled to the at least one computer having instructions stored thereon which, when executed by the at least one computer, causes the at least one computer to perform operations comprising:
receiving, from a content curator, input defining multiple content links to include in a channel associated with the content curator, each content link including an address at which content is made available over a network;
determining supplemental channel information that facilitates user experience of content linked to by at least one of the multiple content links;
defining channel information for the channel associated with the content curator based on the multiple content links and the supplemental channel information;

publishing the defined channel information at a channel link to make the defined channel information available to user devices of a content delivery network, the channel link being a network address at which the defined channel information is made available to the user devices of the content delivery network;

determining, using the network server system, that one or more modifications to the channel information that defines the channel associated with the content curator are needed;

in response to the determination that one or more modifications to the channel information that defines the channel associated with the content curator are needed, identifying, using the network server system, updated channel information that defines updates to the channel information needed to make the one or more modifications;

publishing, using the network server system, the updated channel information at the channel link for the channel associated with the content curator such that user devices of subscribers to the channel associated with the content curator receive the updated channel information through the channel link;

determining whether a user has already experienced all content impacted by the updated channel information;

based on a determination that the user has not already experienced all content impacted by the updated channel information, providing an update message to indicate the updated channel information; and based on a determination that the user has already experienced all content impacted by the updated channel information, withholding the update message.

22. At least one non-transitory computer-readable storage medium encoded with at least one computer program comprising instructions that, when executed, operate to cause a computer to perform operations comprising:

receiving, from a content curator, input defining multiple content links to include in a channel associated with the content curator, each content link including an address at which content is made available over a network;

determining supplemental channel information that facilitates user experience of content linked to by at least one of the multiple content links, wherein the supplemental channel information includes index information that indicates at least one position of interest within content linked to by at least one of the multiple content links;

defining channel information for the channel associated with the content curator based on the multiple content links and the supplemental channel information;

publishing the defined channel information at a channel link to make the defined channel information available to user devices of a content delivery network, the channel link being a network address at which the defined channel information is made available to the user devices of the content delivery network;

determining, using the network server system, that one or more modifications to the channel information that defines the channel associated with the content curator are needed;

in response to the determination that one or more modifications to the channel information that defines the channel associated with the content curator are needed, identifying, using the network server system, updated channel information that defines updates to the channel information needed to make the one or more modifications;

publishing, using the network server system, the updated channel information at the channel link for the channel associated with the content curator such that user devices of subscribers to the channel associated with the content curator receive the updated channel information through the channel link;

determining whether a user has already experienced all content impacted by the updated channel information;

based on a determination that the user has not already experienced all content impacted by the updated channel information, providing an update message to indicate the updated channel information; and based on a determination that the user has already experienced all content impacted by the updated channel information, withholding the update message.

* * * * *